(12) United States Patent
Ioki et al.

(10) Patent No.: US 7,623,111 B2
(45) Date of Patent: Nov. 24, 2009

(54) IMAGE DISPLAY APPARATUS

(75) Inventors: Sadao Ioki, Kiryu (JP); Sanji Arisawa, Joetsu (JP); Seijiro Tomita, Komae (JP)

(73) Assignees: Sophia Inc., Fumma (JP); Arisawa Mfg. Co., Ltd., Niigata (JP); Amita Technologies, Inc., Tokyo (JP)

( * ) Notice: Subject to any disclaimer, the term of this patent is extended or adjusted under 35 U.S.C. 154(b) by 923 days.

(21) Appl. No.: 10/549,126

(22) PCT Filed: Feb. 20, 2004

(86) PCT No.: PCT/JP2004/002041

§ 371 (c)(1),
(2), (4) Date: Sep. 16, 2005

(87) PCT Pub. No.: WO2004/083949

PCT Pub. Date: Sep. 30, 2004

(65) Prior Publication Data

US 2006/0170644 A1    Aug. 3, 2006

(30) Foreign Application Priority Data

Mar. 20, 2003    (JP)    ............................. 2003-077574

(51) Int. Cl.
*G09G 3/36* (2006.01)
(52) U.S. Cl. .................... 345/102; 345/87; 349/61; 362/23; 463/36
(58) Field of Classification Search ........... 345/87–102; 349/56, 61–65; 463/36–39; 362/23, 26–30
See application file for complete search history.

(56) References Cited

U.S. PATENT DOCUMENTS

| 5,339,179 | A | * | 8/1994 | Rudisill et al. ................. 349/65 |
| 5,671,028 | A | * | 9/1997 | Okano ........................... 349/66 |
| 6,014,164 | A | | 1/2000 | Woodgate et al. |
| 6,061,489 | A | | 5/2000 | Ezra et al. |
| 6,144,360 | A | * | 11/2000 | Evanicky et al. ............. 345/102 |
| 6,414,664 | B1 | * | 7/2002 | Conover et al. ............... 345/89 |
| 7,002,644 | B2 | * | 2/2006 | You et al. ..................... 349/58 |
| 7,084,846 | B2 | * | 8/2006 | Adachi et al. ................. 345/89 |
| 2002/0154087 | A1 | * | 10/2002 | Katsu et al. ................. 345/102 |
| 2003/0076286 | A1 | * | 4/2003 | Luo et al. ..................... 345/87 |
| 2004/0017343 | A1 | * | 1/2004 | Adachi et al. ................. 345/87 |
| 2004/0066363 | A1 | * | 4/2004 | Yamano et al. ............... 345/98 |

FOREIGN PATENT DOCUMENTS

| DE | 694 32 283 T2 | 1/2004 |
| EP | 656555 A1 | 6/1995 |

(Continued)

*Primary Examiner*—Richard Hjerpe
*Assistant Examiner*—Kimnhung Nguyen
(74) *Attorney, Agent, or Firm*—Sughrue Mion, PLLC

(57) ABSTRACT

The invention is intended to change the viewing angle in accordance with a viewer's intention. Disposed between a light source (810) and a liquid crystal display panel (804), a Fresnel lens (812) converts light coming from the light source (810) to approximately parallel light and allows plural images to be displayed to different positions. The light source (810) is configured in such a manner that lighting positions and lighting regions can be changed. Lighting control means for changing the lighting positions or lighted regions of the light sources (810) is provided.

11 Claims, 15 Drawing Sheets

FOREIGN PATENT DOCUMENTS

| | | |
|---|---|---|
| GB | 2294350 A | 4/1996 |
| JP | 05-237233 A | 9/1993 |
| JP | 08-211334 A | 8/1996 |
| JP | 09-103558 | 4/1997 |
| JP | 10-63199 A | 3/1998 |
| JP | 11-273438 A | 10/1999 |
| JP | 2001-022319 A | 1/2001 |
| JP | 2001-306175 | 11/2001 |
| JP | 2001-339741 A | 12/2001 |
| JP | 2003-015535 A | 1/2003 |
| KR | 99/078225 A | 10/1999 |
| TW | 518440 A | 1/2003 |

\* cited by examiner

IMAGE DISPLAY APPARATUS

TECHNICAL FIELD

The present invention relates to improvement of an image display apparatus capable of displaying plural kinds of patterns three-dimensionally.

BACKGROUND ART

In conventional display apparatus, in general, the viewing angle is constant which represents a viewable range. As disclosed in JP-A-10-63199, for example, a display apparatus is known that displays a three-dimensional image without the need for using glasses by causing a Fresnel lens to refract rays of light emitted from light sources into parallel rays of light and thereby narrowing the right and left viewing angles.

Further, as disclosed in JP-A-2001-306175, a display apparatus is known in which the viewing angle is narrowed during input of a password to prevent the password from being recognized by another person.

Still further, as disclosed in JP-A-9-103588, a game machine such as a pachinko machine is known that is equipped with a display apparatus in which when "riichi" or the like has occurred a pattern is displayed three-dimensionally as if it projected from the display screen.

[Patent document 1] JP-A-10-63199
[Patent document 2] JP-A-2001-306175
[Patent document 3] JP-A-9-103558

However, the first conventional example (JP-A-10-63199) has a problem that arranging the light sources in the horizontal direction causes an unduly large amount of heat generated if all the light sources are always kept on though the viewing angle can be increased.

The second conventional example (JP-A-2001-306175) has a problem that a viewer who is distant from the display apparatus cannot recognize anything visually because of a narrow viewing angle and hence it is difficult for him or her to judge whether the apparatus itself is in operation. In addition, when an instructor beside an operator instructs the operator, the instructor cannot easily recognize a picture because of a narrow viewing angle, which is, in some cases, an obstacle to the manipulation guidance.

The third conventional example (JP-A-9-103588) has a problem that because of a constant viewing angle it is impossible to discriminate between persons to whom a player wants to show a result of a play and persons to whom the player does not. In general, a player has a psychology that he or she wants to have an "in-riichi" picture viewed by his or her friends who came to the game parlor together with him or her while not wanting to have such a picture viewed by others sitting next to him or her. However, a problem exists that conventional game machines are not configured so as to satisfy such a requirement.

DISCLOSURE OF THE INVENTION

The present invention has been made in view of the above problems, and an object of the invention is therefore to provide an image display apparatus capable of changing the viewing angle in accordance with a viewer's intention.

A first invention provides an image display apparatus in which a liquid crystal display panel having a display area is illuminated by a light source and a viewer sees an image displayed in the display area when illumination light passes through the liquid crystal display panel and reaches an eye or eyes of the viewer, wherein the light source is configured in such a manner that lighting positions or lighted regions can be changed; the image display apparatus comprises optical means for converging light that is emitted from the light source and passes through the liquid crystal display panel so that the light goes to a prescribed range and lighting control means for performing a control of changing the lighting positions or lighted regions of the light source; a range defined by a viewing angle from which an image displayed in the display area is viewable is changed by the lighting control means's changing a diffusion range of light emitted from the light source; and the image display apparatus further comprises a viewing angle notification device for indicating a state of the viewing angle.

A second invention provides an image display apparatus in which a liquid crystal panel having a display area is illuminated by a light source and a viewer sees an image displayed in the display area when illumination light passes through the liquid crystal panel and reaches an eye or eyes of the viewer, wherein the light source is configured in such a manner that lighting positions or lighted regions can be changed; the image display apparatus comprises optical means for converging light that is emitted from the light source and passes through the liquid crystal panel so that the light goes to a prescribed range and lighting control means for performing a control of changing the lighting positions or lighted regions of the light source; a range defined by a viewing angle from which an image displayed in the display area is viewable is changed by the lighting control means's changing a diffusion range of light emitted from the light source; plural kinds of images that are different from each other in information content are displayed in the display area; and the optical means converges light coming from the light source so that images that are different from each other in information content are presented to viewers located at different viewing positions.

A third invention provides an image display apparatus in which a liquid crystal panel having a display area is illuminated by a light source and a viewer sees an image displayed in the display area when illumination light passes through the liquid crystal panel and reaches an eye or eyes of the viewer, wherein the light source is configured in such a manner that lighting positions or lighted regions can be changed; the image display apparatus comprises optical means for converging light that is emitted from the light source and passes through the liquid crystal panel so that the light goes to a prescribed range and lighting control means for performing a control of changing the lighting positions or lighted regions of the light source; a range defined by a viewing angle from which an image displayed in the display area is viewable is changed by the lighting control means's changing a diffusion range of light emitted from the light source; the light source comprises a light-emitting element for emitting light and polarizing means for transmitting, toward the optical means, parts of the light emitted from the light-emitting element that are light having a particular polarization direction and light whose polarization direction is perpendicular to the particular polarization direction; and the image display apparatus further comprises filter means disposed between the liquid crystal display panel and the optical means and configured in such a manner that first regions for transmitting light having the particular polarization direction and second regions for transmitting light whose polarization direction is perpendicular to the particular polarization direction are arranged repeatedly in a prescribed direction.

A fourth invention is such that, in any one of the first to third inventions, the lighting control means comprises viewer position detecting means for detecting a viewing position of a viewer, and controls a lighting state of the light source so that the viewing angle is changed in accordance with the detected viewing position.

A fifth invention is such that, in any one of the first to third inventions, the lighting control means comprises viewer presence detecting means for detecting presence/absence of a viewer, and controls a lighting state of the light source so that the viewing angle when no viewer is detected is set larger than the viewing angle when a viewer is detected.

A sixth invention is such that, in any one of the first to third inventions, the image display apparatus further comprises navigation means for detecting position information of a vehicle and for displaying the detected position information in the display area of the liquid crystal panel together with map information; and that the lighting control means comprises running state detecting means for detecting whether the vehicle is running or not, and controls a lighting state of the light source so as to stop displaying of an image to a driver side if the vehicle is running and to permit the display of an image to the driver side if the vehicle is parked.

A seventh invention is such that, in the fourth invention, the image display apparatus further comprises navigation means for detecting position information of a vehicle and for displaying the detected position information in the display area of the liquid crystal display panel together with map information; and that the lighting control means comprises running state detecting means for detecting whether the vehicle is running or not, and controls a lighting state of the light source so as to stop display of an image to a driver side if the vehicle is running and to permit display of an image to the driver side if the vehicle is parked.

An eighth invention is such that, in the fifth invention, the image display apparatus further comprises navigation means for detecting position information of a vehicle and for displaying the detected position information in the display area of the liquid crystal display panel together with map information; and that the lighting control means comprises running state detecting means for detecting whether the vehicle is running or not, and controls a lighting state of the light source so as to stop display of an image to a driver side if the vehicle is running and to permit display of an image to the driver side if the vehicle is parked.

A ninth invention is such that, in any one of the first to third inventions, the image display apparatus further comprises game control means for performing a variable display game by variably displaying plural pieces of identification information in the display area of the liquid crystal display panel and for giving a prize to a player in such a manner that the prize is correlated with a stop display form of the plural pieces of identification information and viewing angle selecting means for selecting a viewing angle in accordance with a manipulation input, and that the lighting control means controls a lighting state of the light source in accordance with the viewing angle selected by the viewing angle selecting means.

A 10th invention is such that, in any one of the first to third inventions, the image display apparatus further comprises game control means for performing a variable display game by variably displaying plural pieces of identification information in the display area of the liquid crystal display panel and for giving a prize to a player in such a manner that the prize is correlated with a stop display form of the plural pieces of identification information and viewing angle selecting means for selecting a viewing angle in accordance with a manipulation input, and that the lighting control means comprises viewer position detecting means for detecting a viewing position of a viewer, controls a lighting state of the light source so that the viewing angle is changed in accordance with the detected viewing position, and controls the lighting state of the light source in accordance with the viewing angle selected by the viewing angle selecting means.

An 11th invention is such that, in any one of the first to third inventions, the image display apparatus further comprises game control means for performing a variable display game by variably displaying plural pieces of identification information in the display area of the liquid crystal display panel and for giving a prize to a player in such a manner that the prize is correlated with a stop display form of the plural pieces of identification information and viewing angle selecting means for selecting a viewing angle in accordance with a manipulation input; and that the lighting control means comprises viewer presence detecting means for detecting the presence or absence of a viewer, controls a lighting state of the light source so that the viewing angle is set larger when no viewer is detected than when a viewer is detected, and controls the lighting state of the light source in accordance with the viewing angle selected by the viewing angle selecting means.

Therefore, according to the first invention, the image viewable range (viewing angle) can be changed by changing the lighting positions or lighted regions of the light source. A viewing angle suitable for a viewer can be realized by setting the lighting positions or lighted regions to desired ones.

Further, since information relating to a current viewing angle can be shown by the viewing angle notification device that is provided as an indicator for indicating a viewing angle, a viewing angle can be shown to a viewer in an easy-to-recognize manner.

According to the second invention, since one of plural images is displayed in accordance with the position of a viewer, only an image that can be viewed from the viewer position can be presented.

According to the third invention, the light source is composed of the light-emitting element and the polarizing means and polarized light beams that have passed through the polarizing means are converged by the optical means so as to be directed to different viewing angle directions. And the filter means that is provided with first regions capable of transmitting only one kind of polarized light and second regions capable of transmitting only another kind of polarized light is used for drawing an image to be displayed on the liquid crystal panel separately for the first regions and the second regions. As a result, a first image corresponding to the first regions and a second image corresponding to the second regions can be presented separately to viewers located in different viewing angle ranges. It also becomes possible to present a three-dimensional image to a viewer by giving parallax to first and second images.

According to the fourth invention, since the image viewable range (viewing angle) can be changed in accordance with the position of a viewer, only an image that can be viewed from the viewer position can be presented.

According to the fifth invention, changing the lighting positions or lighted regions so as to enlarge the viewing angle when no viewer is detected makes it possible to notify persons around the apparatus that the apparatus is in operation by enlarging the viewable range.

According to the sixth to eighth inventions, the navigation means for detecting position information of a vehicle and for displaying the detected position information on the liquid crystal display panel together with map information is provided. Display of an image to the driver side is stopped if the vehicle is running, whereas display of an image to the driver side is permitted if the vehicle is parked. This prevents the driver from looking aside and hence can increase the safety.

According to the ninth to 11th inventions, a variable display game is performed by variably displaying plural pieces of identification information on the liquid crystal display panel and a viewing angle is selected in accordance with a manipulation by a player, whereby the player can set a viewable range from which he or she can view the variable display game. This makes it possible to prevent another person from viewing a variable display game or show a variable display game to particular persons (friends).

BEST MODE FOR CARRYING OUT THE INVENTION

Embodiments of the present invention will be hereinafter described with reference to the drawings.

Figure 1:
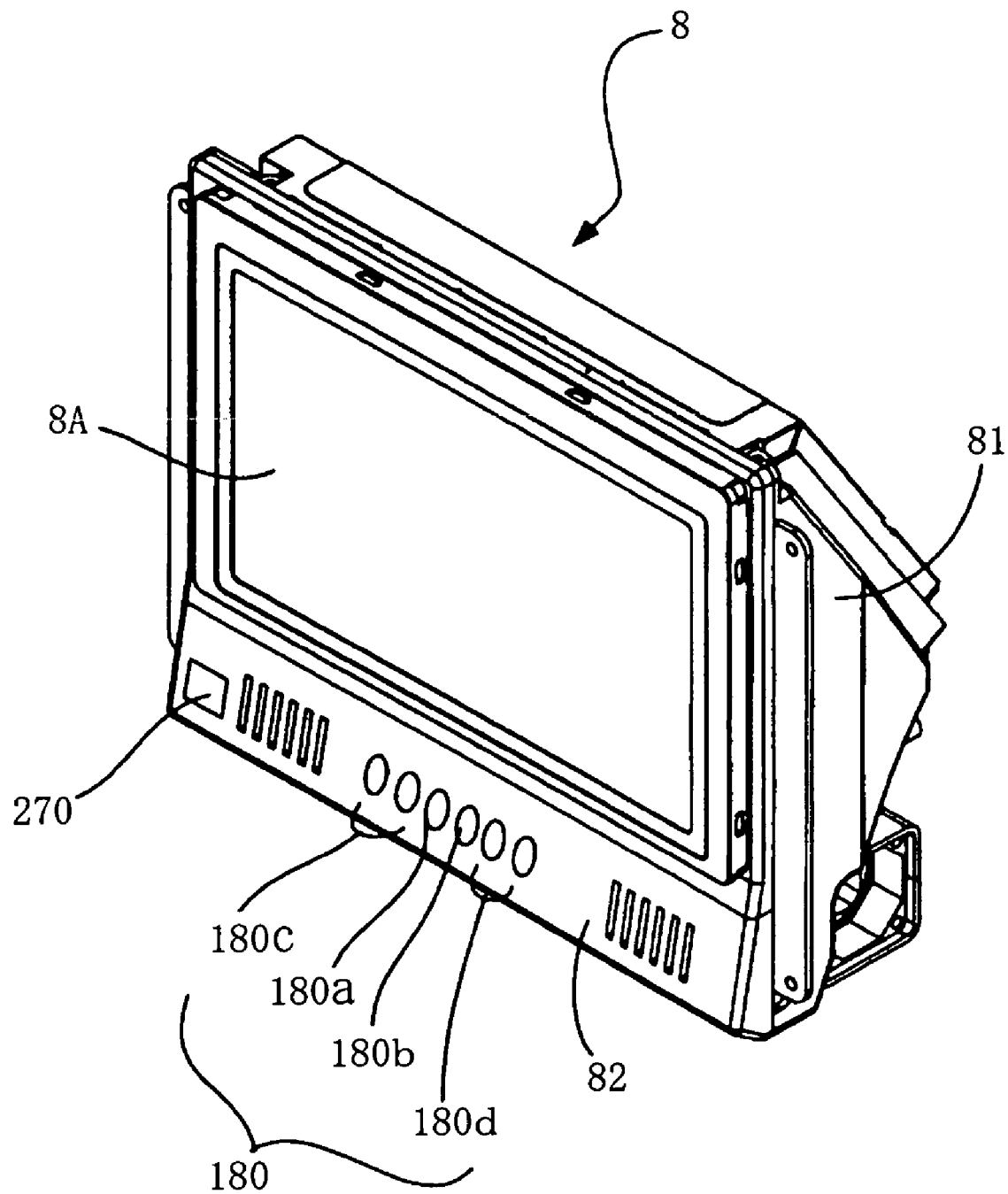
FIG. 1 is a perspective view showing the entire configuration of an image display apparatus according to a first embodiment of the present invention.

FIG. 1 is a perspective view showing the entire configuration of an image display apparatus according to a first embodiment of the invention.

The image display apparatus 8 is equipped with, in front of a chassis 81, a display section 8A consisting of a liquid crystal display panel or the like and a front panel 82. The image display apparatus 8 is also equipped with, inside the chassis 81, a light source as a backlight for illuminating the liquid crystal display panel as well as other components.

The front panel 82 which is equipped with a viewing angle indicator 180 and a viewer sensor 170 is disposed under the display section 8A which is disposed in front of the chassis 81.

The image display apparatus 8 displays a right-eye (or right-side) image and a left-eye (or left-side) image alternately every horizontal scanning line using an optical system (described later). Further, the image display apparatus 8 is configured so as to be able to change the ranges (viewing angles) where right-side and left-side images are viewable, respectively.

Therefore, the viewing angle indicator 180 is composed of light-emitting portions 180a, 180b, 180c, and 180d that are plural light-emitting members and can be subjected to independent on/off controls. The light-emitting portions 180a-180d are arranged in the horizontal direction. The viewing angle indicator 180 shows that a left-eye (left-side) image is displayed if the light-emitting portion 180a is turned on, and shows establishment of a state that the left-eye image viewing angle is increased if the light-emitting portion 180c is turned on. Likewise, the viewing angle indicator 180 shows that the right-eye (right-side) image is displayed if the light-emitting portion 180b is turned on, and shows establishment of a state that the right-eye image viewing angle is increased if the light-emitting portion 180d is turned on.

The viewer sensor 270 for detecting presence/absence of a viewer is provided in the front panel 82 at a left end position. The viewer sensor 270 is an infrared sensor, for example.

Figure 2:
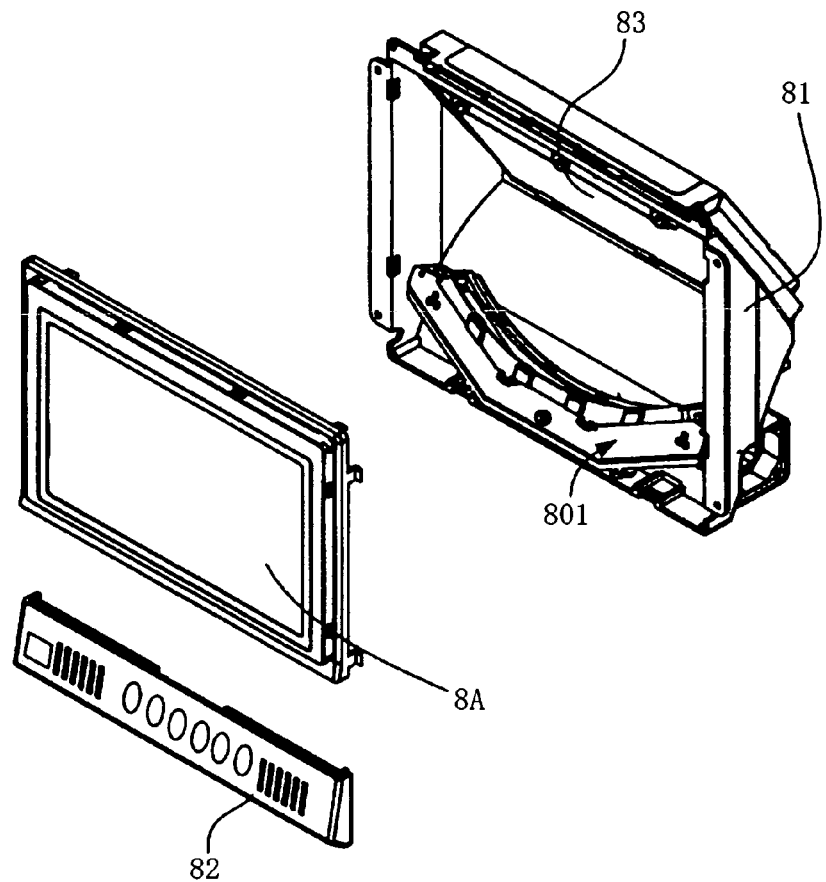
FIG. 2 is an exploded perspective view of the same.

FIG. 2 is an exploded perspective view of the image display apparatus 8.

A light source unit 801 is disposed inside of the chassis 81, more specifically, at the bottom thereof, and a mirror 83 that is inclined at a prescribed angle is disposed over the light source unit 801. The light source unit 801 is fixed so as to be directed to the mirror 83, and the mirror 83 is disposed so as to reflect light coming from the light source unit 801 toward the display section 8A.

Figure 3:
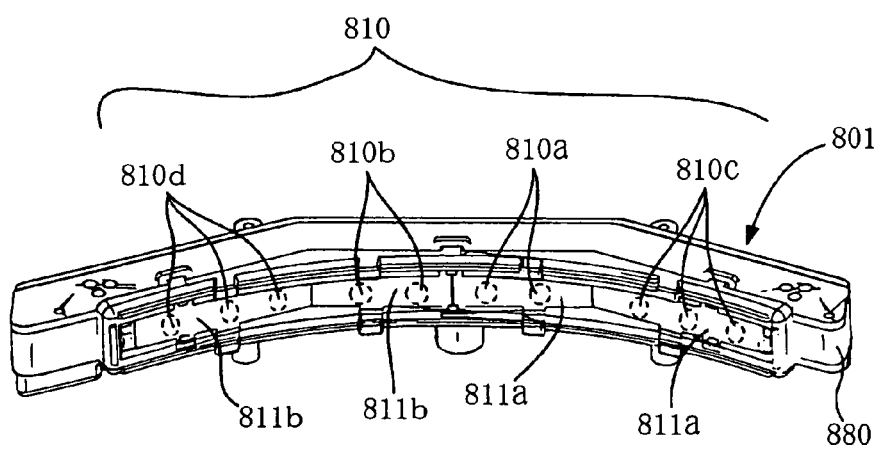
FIG. 3 is a perspective view of a light source unit of the same.

FIG. 3 is a perspective view of the light source unit 801.

The light source unit 801 incorporates plural light-emitting elements 810 in an arc-shaped case 880, and is equipped with a polarizing filter 811 (polarizing means) on an inner circumferential surface that is opposed to the mirror 83.

A right-side region 811a of the polarizing filter 811 is disposed on the inner circumferential surface of the light source unit 801 in the region on the right of the center, and a left-side region 811b of the polarizing filter 811 is disposed on the inner circumferential surface of the light source unit 801 in the region on the left of the center. The right-side region 811a and the left-side region 811b are set so as to give transmitted light different polarization states (e.g., polarization axes that are different from each other by 90°).

Light-emitting elements 810a as a left-eye (left-side) image backlight are set inside the right-side region 811a of the polarizing filter. Light-emitting elements 810c for viewing angle enlargement that are turned on when the left-eye image viewing angle is enlarged are disposed outside (on the right side in the figure) of the left-eye light-emitting elements 810a.

Likewise, light-emitting elements 810b as a right-eye (right-side) image backlight are set inside the left-side region 811b of the polarizing filter. Light-emitting elements 810d for viewing angle enlargement that are turned on when the right-eye image viewing angle is enlarged are disposed outside (on the left side in the figure) of the right-eye light-emitting elements 810b.

Each of the light-emitting elements 810a-810d is a linear array of a large number of point light sources such as white light-emitting diodes (LEDs) or a horizontally-oriented linear light source such as a cold-cathode tube. In the following description, the light-emitting element 810 is defined as the collection of the light-emitting elements 810a-810d.

The polarizing filter 811 transmits only part, having prescribed polarization, of light emitted from the light-emitting element 810. That is, the light which is emitted from the light-emitting element 810 and passes through the left-side region 811b of the polarizing filter 811 and the light that passes through its right-side region 811a are light beams that are different from each other in polarization. Those light beams reflect on the mirror 83, and resulting reflection light beams are input to the display section 8A (described later). As described later, because of the presence of a Fresnel lens 812 which is provided in the display section 8A, the light that has passed through the left-side region 811b of the polarizing filter 811 reaches the right eye of a viewer and the light that has passed through right-side region 811a reaches the left eye of the viewer.

The use of a light-emitting element and polarization filters is not indispensable; satisfactory results can be obtained as long as light beams that are different from each other in polarization and come from different positions are input to the Fresnel lens 812. For example, a configuration is possible in which two light-emitting elements generating light beams that are different from each other in polarization and light beams that are different from each other in polarization are input to the Fresnel lens 812 from different positions.

Figure 4:
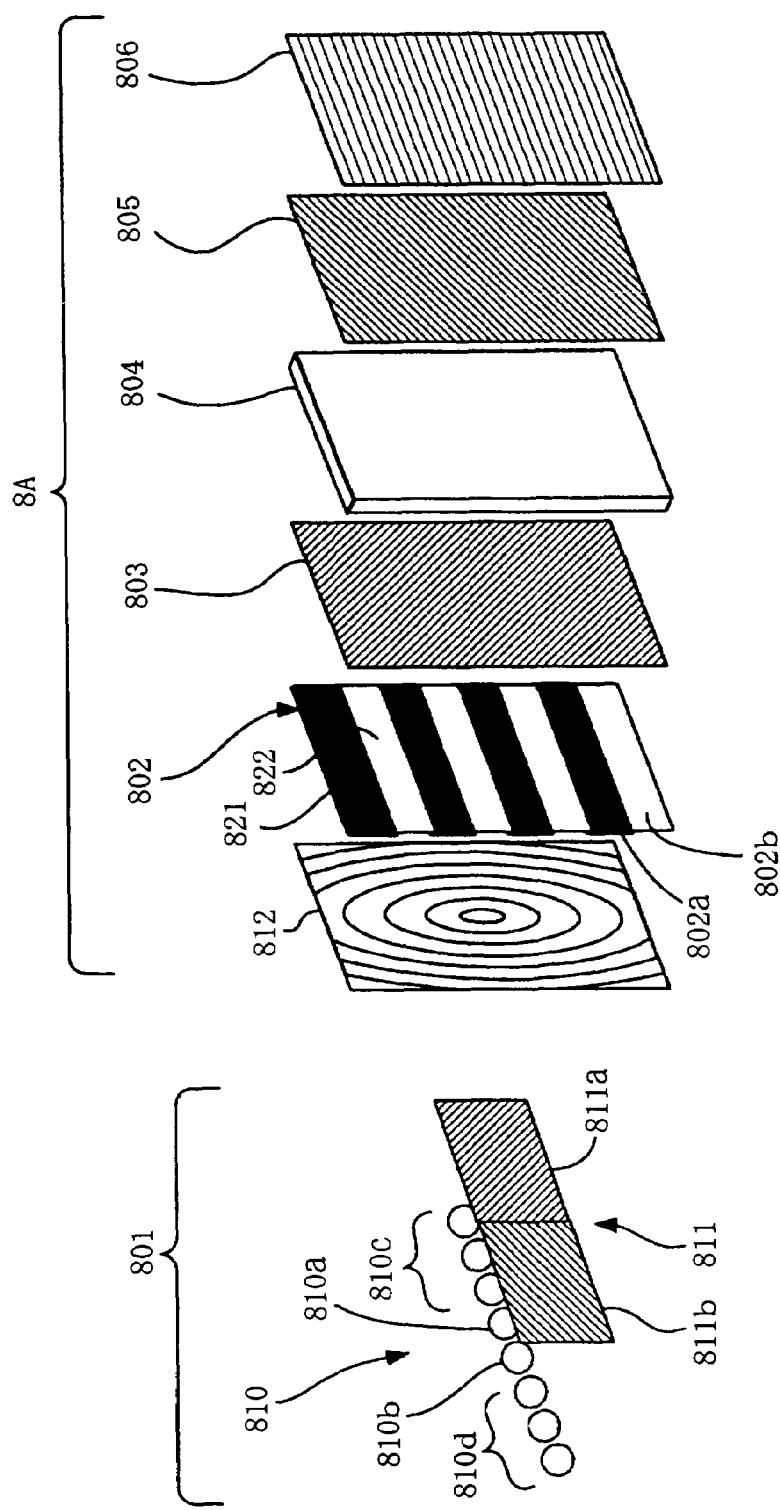
FIG. 4 is an exploded perspective view of an optical system of the same.

FIG. 4 is an explanatory diagram showing the configuration of the optical system of the image display apparatus 8. This optical system is composed of the light source unit 801 of FIG. 3 and the display section 8A consisting of the Fresnel lens 812, a liquid crystal display panel 804, or the like.

Light that has been emitted from the light-emitting element 810 of the light source unit 801 and has passed through the polarizing filter 811 (polarizing means) first reflects on the Fresnel lens 812 of the display section 8A. Being a convex lens, the Fresnel lens 812 refracts diverging rays of light emitted from the light-emitting element 810 into parallel rays of light and collimate to pass through a micro-patterned retarder 802 and then reflect on the liquid crystal display panel 804.

Light that has passed through the micro-patterned retarder 802 is output from it so as not to diverge in the vertical direction and is then input to the liquid crystal display panel 804. That is, light that has passed through a particular region of the micro-patterned retarder 802 passes through a particular display unit portion of the liquid crystal display panel 804.

The light which is input to the liquid crystal display panel 804 and passes through the right-side region 811a of the polarizing filter 811 and light that passes through its left-side region 811b reflect on the Fresnel lens 812 at different angles and are refracted by the Fresnel lens 812, whereby they are output from the liquid crystal display panel 804 so as to travel along different paths.

The liquid crystal display panel 804 is such that a liquid crystal that is twisted by a prescribed angle (e.g., 90°) is interposed between two transparent plates (e.g., glass plates), and is a TFT liquid display crystal panel, for example. Light entering the liquid crystal display panel is output from it as light whose polarization direction is deviated from the polarization direction of the incident light by 90° in a state that no voltage is applied to the liquid crystal. On the other hand, in a state that a voltage is applied to the liquid crystal, incident light is output with its polarization direction unchanged because the liquid crystal is no longer twisted.

The micro-patterned retarder 802 and a polarizer 803 (first polarizer) are disposed on the light source 801 side of the liquid crystal display panel 804 and a polarizer 805 (second polarizer) is disposed on the player (viewer) side.

The micro-patterned retarder 802 is such that regions for changing the phase of light being transmitted are arranged repeatedly at very small intervals. More specifically, regions 802a that have a very small width and are provided with a half-wave retarder 821 and regions 802b that have the same very small interval as the regions 802a and are not provided with a half-wave retarder 821 are formed repeatedly at very small intervals on a light-transparent substrate 822. That is, the regions 802a that change the phase of light being transmitted because of presence of the half-wave retarder and the regions 802b which do not change the phase of light being transmitted because of absence of the half-wave retarder 821 are provided repeatedly at the very small intervals. The half-wave retarder 821 serves as a phase plate for changing the phase of light being transmitted.

The half-wave retarder 821 is disposed in such a manner that its optical axis is inclined by 45° from the polarization axis of light that has passed through the right-side region 811a of the polarizing filter 811, and thereby rotates, by 90°, the polarization axis of light that has passed through the right-side region 811a. That is, the half-wave retarder 821 outputs light that has passed through the right-side region 811a after rotating its polarization direction by 90°, so that its polarization direction coincides with the polarization direction of light that has passed through the left-side region 811b.

The pitch of repetition of the polarization characteristic of the micro-patterned retarder 802 is set approximately the same as the display unit pitch of the liquid crystal display panel 804 so that the polarization of transmitted light varies every display unit (i.e., every horizontal line of display units). The polarization characteristic of the micro-patterned retarder 802 varies every region corresponding to a horizontal line of display units (scanning line) of the liquid crystal display panel 804, and hence the polarization direction of output light varies every horizontal line.

Alternatively, the pitch of repetition of the polarization characteristic of the micro-patterned retarder 802 may be set integer times the display unit pitch of the liquid crystal display panel 804 so that the polarization characteristic of the micro-patterned retarder 802 varies every region corresponding to plural display units (i.e., every plural horizontal lines of display units) and hence the polarization of transmitted light varies every plural display units. In this case, the polarization characteristic of the micro-patterned retarder varies every region corresponding to plural horizontal lines of display units (scanning lines) of the liquid crystal display panel 804, and hence the polarization direction of output light varies every plural horizontal lines.

As described above, it is necessary to apply different light beams to the display elements (horizontal lines) of the liquid crystal display panel 804 for the respective units of repetition of the polarization characteristic of the micro-patterned retarder 802. Therefore, it is necessary that light that is transmitted from the micro-patterned retarder 802 and is to be applied to the liquid crystal display panel 804 be suppressed in diffusion in the vertical direction.

The regions 802a of the micro-patterned retarder 802 that change the phase of light transmit light that has passed through the right-side region 811a of the polarizing filter 811 after changing it to light whose polarization direction is inclined by the same angle as the polarization direction of light that has passed through the left-side region 811b. The regions 802b of the micro-patterned retarder 802 that do not change the phase of light transmit, as it is, light that has passed through the left-side region 811b of the polarizing filter 811. Light that is output from the micro-patterned retarder 802 and has the same polarization as light that is transmitted from the left-side region 811b reflects on polarizer 803 which is disposed on the light source side of the liquid crystal display panel 804.

The polarizer 803 has such a polarization characteristic as to transmit light having the same polarization as light that is transmitted from the left-side region 811b of the polarizing filter 811. That is, light that has passed through the left-side region 811b of the polarizing filter 811 passes through the regions 802b of the micro-patterned retarder 802 that do not change the phase of light and then passes through the polarizer 803 as it is. Light that has passed through the right-side region 811a of the polarizer 811 is subjected to 90° polarization axis rotation in passing through the regions 802a of the micro-patterned retarder 802 that change the phase of light, and then passes through the polarizer 803. Therefore, by combining the micro-patterned retarder 802 and the polarizer 803, a first polarizer (filtering means) can be formed in which regions that transmit light that has passed through the left-side region 811b of micro-patterned retarder 811 and regions that transmit light whose polarization direction is deviated from the polarization direction of the former light by 90° are arranged repeatedly in the vertical direction. The polarizer 805 functions as a second polarizer and has such a polarization characteristic as to transmit light whose polarization direction is deviated by 90° from light that passes through the polarizer 803.

A diffuser 806, which is disposed in front of (i.e., on the viewer side of) the polarizer 805, functions as diffusing means for diffusing, in the vertical direction, light that is transmitted from the liquid crystal display panel. More specifically, light that is transmitted from the liquid crystal display panel is diffused in the vertical direction by a lenticular lens having semicylindrical structures that are arranged repeatedly in the vertical direction.

Instead of the lenticular lens, a member having a mat-shaped diffusion surface whose diffusion directivity is higher in the vertical direction may be provided. This is a countermeasure against a narrow viewing angle that is caused by the fact that the vertical diffusion of light is suppressed until it passes through the liquid crystal display panel 804.

Figure 5:
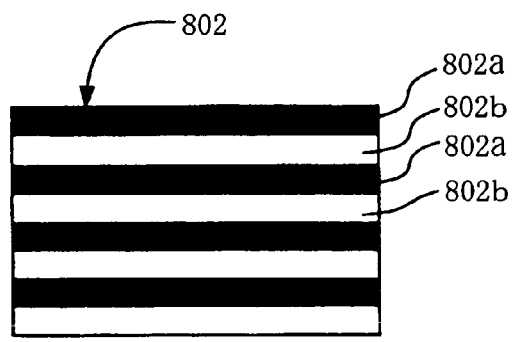
FIG. 5 is a front view of a micro-patterned retarder of the same.

FIG. 5 is a front view of the micro-patterned retarder 802 of the image display apparatus according to the embodiment of the invention.

In the micro-patterned retarder 802, the regions that are provided with a half-wave retarder and change the polarization of light being transmitted are arranged repeatedly at prescribed very small intervals without breaks. The regions arranged repeatedly without breaks receive light beams that have passed through the right-side region 811a and the left-side region 811b of the polarizing filter 811 and are different from each other in polarization. The regions for changing the polarization of light being transmitted outputs incident light after rotating its polarization axis by 90°. The pitch of repetition of the polarization characteristic of the micro-patterned retarder 802 is approximately the same as the display unit pitch of the liquid crystal display panel 804.

That is, light that has passed through the right-side region 811a of the polarizing filter 811 and subjected to 90° polarization axis rotation by the micro-patterned retarder and light that has passed through the left-side region 811b of the polarizing filter 811 and passed through the micro-patterned retarder 802 as it is have polarization axes extending in the same direction and pass through the second polarizer. Since the regions of the micro-patterned retarder 802 that change the polarization of light and its regions that do not change the polarization of light are arranged repeatedly every horizontal line of display units of the liquid crystal display panel 804 without breaks, light beams that have passed through the micro-patterned retarder 802 and the second polarizer 803 and correspond to the respective horizontal lines have the same polarization and are directed to different directions.

As described above, the pitch of repetition of the polarization characteristic of the micro-patterned retarder 802 may be set integer times the display unit pitch of the liquid crystal display panel 804 so that the polarization characteristic of the micro-patterned retarder 802 varies every region corresponding to plural display units and hence the polarization of transmitted light varies every plural display units.

Figure 6:
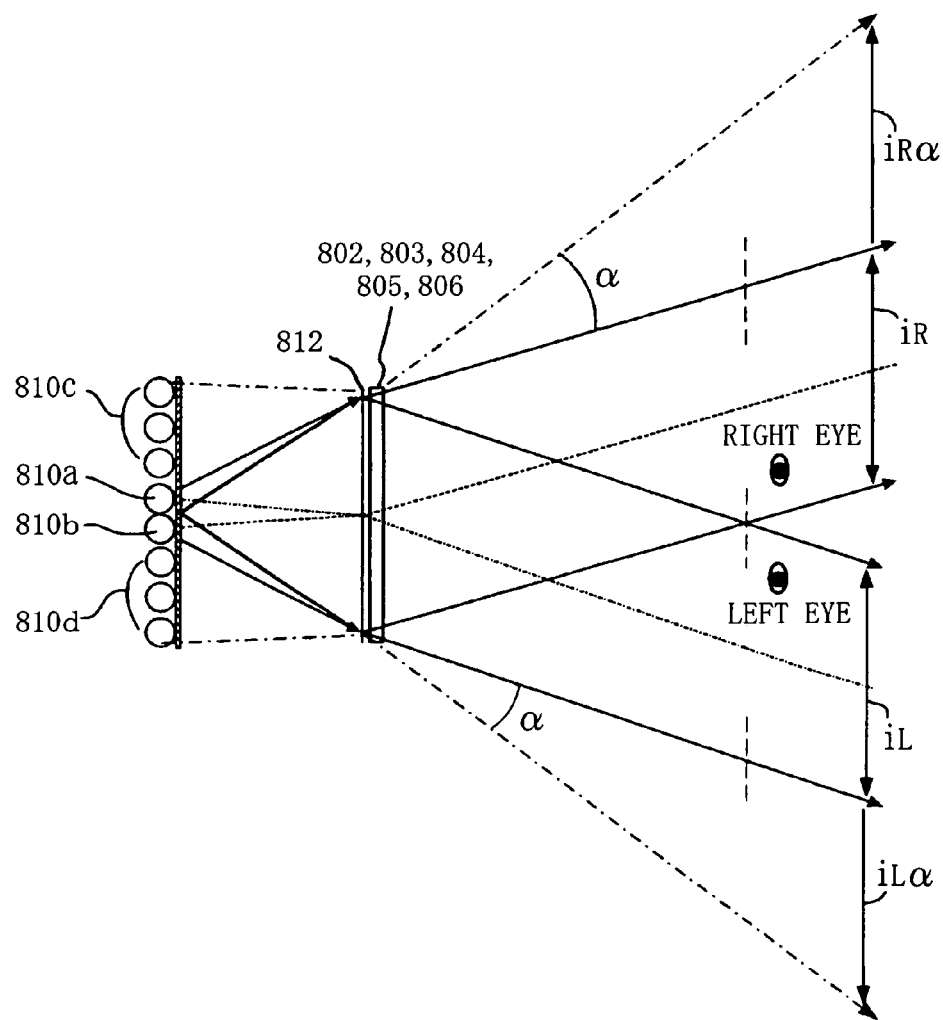
FIG. 6 is a plan view of an optical system of the same.

FIG. 6 is a plan view showing the optical system of the image display apparatus 8. To simplify the description, the mirror 83 is omitted in FIG. 6.

Light that is emitted from the light-emitting element 810 passes through the polarizing filter 811 and then diverges radially. The light that is output from the left-eye image light-emitting element 810a, which is part of the light-emitting element 810, and passes through the right-side region 811a of the polarizing filter 811 reaches the Fresnel lens 812. After being subjected to traveling direction change by the Fresnel lens 812, the light reaches the micro-patterned retarder 802, the liquid crystal display panel 804, and the polarizer 805 in order and passes through those approximately perpendicularly (slightly moves right to left). The light finally reaches the left eye or a left-side viewer.

On the other hand, the light that is output from the right-eye image light-emitting element 810b and passes through the left-side region 811b of the polarizing filter 811 reaches the Fresnel lens 812. After being subjected to traveling direction change by the Fresnel lens 812, the light reaches the micro-patterned retarder 802, the liquid crystal display panel 804, and the polarizer 805 in order and passes through those approximately perpendicularly (slightly moves left to right). The light finally reaches the right eye or a right-side viewer.

As described above, a light source 801 such that light that has been emitted from the light-emitting element 810 and passed through the polarizing filter 811 is applied to the liquid crystal display panel 804 approximately perpendicularly by the Fresnel lens 812 as optical means and that light beams having different polarization planes are applied, by the light-emitting element 810, the polarizing filter 811, and the Fresnel lens 812, to the liquid crystal display panel 804 approximately perpendicularly after traveling along the different paths. The light beams are output from the liquid crystal display panel 804 so as to take the different paths and reach the right eye and left eye (or the right-side and left-side viewers), respectively. The scanning line pitch of the liquid crystal display panel 804 is set equal to the polarization characteristic repetition pitch of the micro-patterned retarder 802, whereby light beams corresponding to the respective scanning lines of the liquid crystal display panel 804 and coming from the different directions are applied to the liquid crystal display panel 804 and output from it to the different directions.

A left-eye image and a right-eye image are alternately displayed every scanning line on the liquid crystal display panel 804 by applying to it light beams emitted from the light-emitting elements 810a and 810b, whereby a left-eye-image-viewable range iL and a right-eye-image-viewable range iR (both enclosed by approximately parallel solid lines in FIG. 6) are formed so as to intersect each other at a prescribed angle. As seen from the figure, if a viewing point is set at a position having a prescribed distance from the display screen of the image display apparatus 8, only the left-eye image is input to the left eye and only the right-eye image is input to the right eye. The viewer recognizes those images as a three-dimensional image if parallax exists between the left-eye image and the right-eye image.

If the light-emitting elements 810c for left-eye image viewing angle enlargement are turned on, as indicated by chain lines in the figure, another left-eye-image-viewable range iLα is added outside the left-eye-image-viewable range iL which is enclosed by approximately parallel rays. If the light-emitting elements 810a and 810c are turned on together, the left-eye-image-viewable range is enlarged to a range iL+iLα as shown in the figure.

Similarly, if the light-emitting elements 810d for right-eye image viewing angle enlargement are turned on, as indicated by chain lines in the figure, another right-eye-image-viewable range iRα is added outside the right-eye-image-viewable range iR which is enclosed by approximately parallel rays. If the light -emitting elements 810b and 810d are turned on together, the right-eye-image-viewable range is enlarged to a range iR+iRα as shown in the figure.

Figure 7:
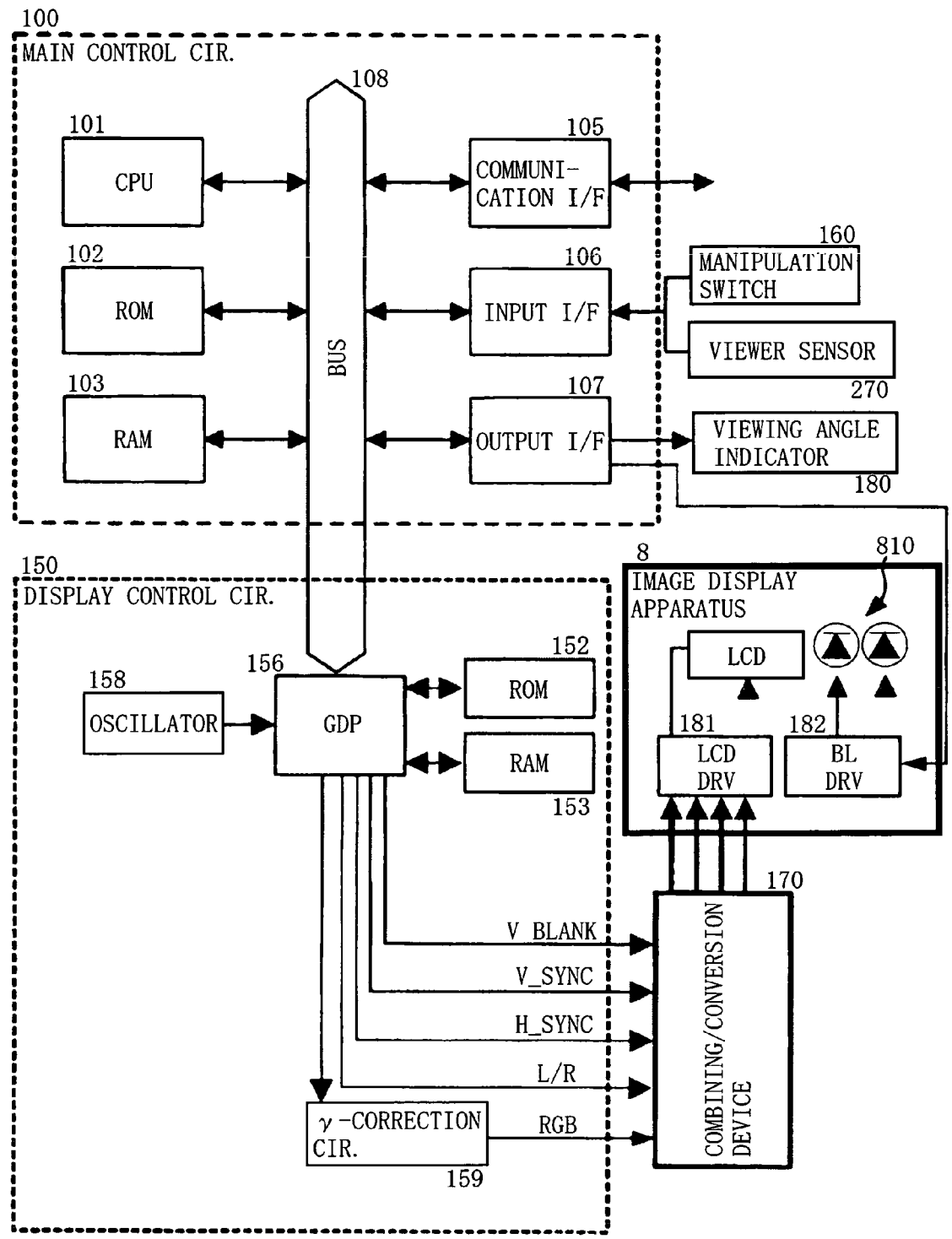
FIG. 7 is a block diagram of a control system.

FIG. 7 is a block diagram of a driving circuit of the image display apparatus according to the embodiment of the invention.

A main control circuit 100 for driving the image display apparatus 8 according to the embodiment of the invention is equipped with a CPU 101, a ROM 102 in which programs or the like are stored in advance, and a RAM 103 which is a memory used as a work area during operation of the CPU 101. The CPU 101, the ROM 102, and the RAM 103 are connected to each other via a bus 108. The bus 108 consists of address and data buses that are used when the CPU 101 reads or writes data.

A communication interface 105 for controlling input from and output to the outside, an input interface 106, and an output interface 107 are also connected to the bus 108. The communication interface 105 is a data input/output section for performing a data communication according to a prescribed communication protocol. The input interface 106 and the output interface 107 serve for input and output of image data to be displayed on the image display apparatus 8.

A graphic display processor (GDP) 156 of a display control circuit 150 is also connected to the bus 108. The GDP 156 performs calculation on image data generated by the CPU 101, writes resulting data to a frame buffer that is provided in the RAM 153, and generates signals (image signals RGB, vertical synchronizing signal V_SYNC, horizontal synchronizing signal H_SYNC, and L/R signal) to be output to the image display apparatus 8. A ROM 152 and the RAM 153 are connected to the GDP 156, and the RAM 153 is provided with a work area for operation of the GDP 156 and the frame buffer for storing displayed data. Programs and data that are necessary for operation of the GDP 156 are stored in the ROM 152.

An oscillator 158 for supplying clock signals to the GDP 156 is also connected to the GDP 156. The clock signal generated by the oscillator 158 determines an operation cycle of the GDP 156 as well as cycles of the sync signals (e.g., vertical sync signal V_SYNC) that are output from the GDP 156.

The RGB signals that are output from the GDP 156 are input to a γ-correction circuit 159. The γ-correction circuit 159 generates RGB signals to be output to the image display apparatus 8 by adjusting the display brightness of the image display apparatus 8 by correcting for nonlinearity of the brightness against the signal voltage of the image display apparatus 8.

A combining/conversion device 170, which is equipped with a right-side frame buffer, a left-side frame buffer, and an output frame buffer, writes a right-side image to the right-side frame buffer if the L/R signal sent from the GDP 156 indicates "R" and writes a left-side image to the left-side frame buffer if the L/R signal indicates "L." The combining/conversion device 170 combines the right-side image and the left-side image together, writes a resulting image to the output frame buffer, and outputs right-side and left-side image data to the image display apparatus 8 as RGB signals.

The right-side image and the left-side image are combined together so as to conform to the spaced arrangement of the half-wave retarders 821 of the micro-patterned retarder 802. More specifically, since the half-wave retarders 821 of the micro-patterned retarder 802 of the image display apparatus 8 according to the embodiment are arranged at the same intervals as the display units of the liquid crystal display panel 804, the right-side image and the left-side image are displayed alternately every horizontal line of display pixels (scanning line) of the liquid crystal display panel 804.

Left-side image data that are transmitted from the GDP 156 during output of the L signal are written to the left-side frame buffer, and right-side image data that are transmitted from the GDP 156 during output of the R signal are written to the right-side frame buffer. The left-side image data and the right-side image data that have been written to the left-side frame buffer and right-side frame buffer, respectively, are read out and written to the output frame buffer on a scanning line basis.

A liquid crystal driver (LCD DRV) 181 and a backlight driver (BLDRV) 182 are provided inside the image display apparatus 8. The liquid crystal driver (LCD DRV) 181 displays a combined image on the liquid crystal display panel by applying voltages to the electrodes of the liquid crystal display panel sequentially on the basis of the V_SYNC signal, the H_SYNC signal, and the RGB signals that are sent from the combining/conversion device 170.

The backlight driver 182 switches the viewing angle by changing the duty ratios of voltages applied to the light-emitting element 810 on the basis of signals (duty signals DTY_CTR) that are output from the output interface 107 of the main control circuit 100. The light-emitting elements 810a-810d are on/off-controlled on the basis of independent duty signals.

The viewer sensor 270 (see FIG. 1) for detecting a viewer is connected to the input interface 106 of the main control circuit 100. The CPU 101 reads a signal from the viewer sensor 270 and thereby detects presence/absence of a viewer. For example, the viewer sensor 270 may be an infrared sensor or the like capable of detecting a viewer who is located within a preset distance of the image display apparatus 8 and in the range of a prescribed viewing angle of the image display apparatus 8.

A manipulation switch 160 for setting a viewing angle is connected to the input interface 106 of the main control circuit 100. An instruction from a viewer is input through the manipulation switch 160.

The viewing angle indicator 180 (see FIG. 1) for indicating the viewing angle of a current display is connected to the output interface 107 of the main control circuit 100.

Figure 8:
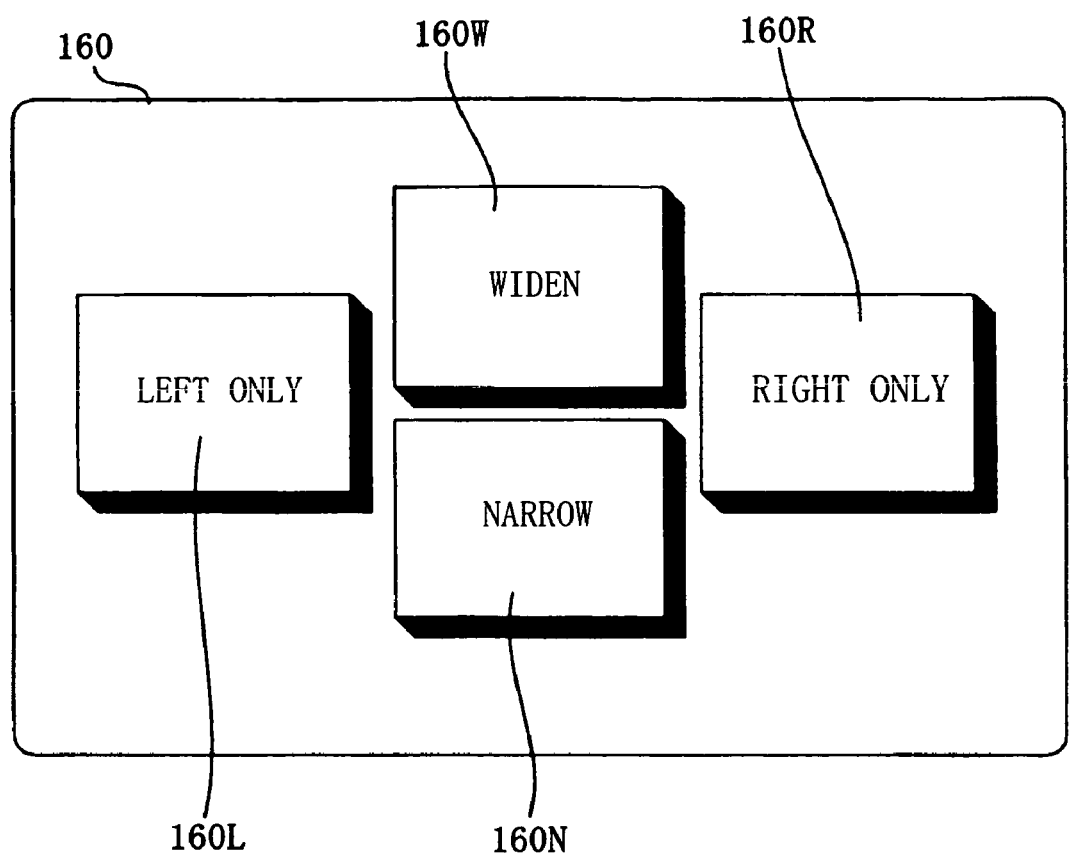
FIG. 8 is a schematic diagram of a manipulation switch of the same.

FIG. 8 is a schematic diagram of an exemplary manipulation switch 160 that is formed by push buttons.

In the figure, a "narrow" button 160N is manipulated to widen the viewing angle in the case of a single viewer, for example. When the button 160N is depressed, the main control circuit 100 turns on only the left-eye light-emitting elements 810a and the right-eye light-emitting element 810b (i.e., central light-emitting elements) of the light-emitting element 810 of the image display apparatus 8 and turns off the other light-emitting elements. At the same time, the main control circuit 100 turns on the light-emitting portions 180a and 180b (i.e., central light-emitting portions) of the viewing angle indicator 180 shown in FIG. 1 to indicate that the viewing angle is narrow.

In the figure, a "widen" button 160W is manipulated to narrow the viewing angle in the case where, for example, plural viewers watch the image display apparatus 8 or no viewer is detected. When the button 160W is depressed, the main control circuit 100 turns on all the light-emitting elements 810*a*-810*d* of the light-emitting element 810 of the image display apparatus 8, as a result of which a widest viewing angle (in the figure, iL+iL$\alpha$+iR+iR$\alpha$) is obtained as shown in FIG. 6. At the same time, the main control circuit 100 turns on all the light-emitting portions 180*a*-180*d* of the viewing angle indicator 180 shown in FIG. 1 to indicate that the viewing angle is in a maximum state.

In the figure, a "left only" button 160L is manipulated in the case of displaying only a left-eye image to a viewer who is located in the range (viewing angle) iL+iL$\alpha$ shown in FIG. 6 (i.e., to only a viewer located in a left-side range in front of the image display apparatus 8). When the button 160L is depressed, the main control circuit 100 turns on only the left-eye light-emitting elements 810*a* and 810*c* of the light-emitting element 810 of the image display apparatus 8 and turns off the other light-emitting elements, as a result of which only a left-side viewing angle is obtained as indicated by iL+iL$\alpha$ in FIG. 6. At the same time, the main control circuit 100 turns on the light-emitting portions 180*a* and 180*c* (i.e., the light-emitting portions on the left of the center) of the viewing angle indicator 180 shown in FIG. 1 to indicate that only a left-side viewing angle is available.

In the figure, a "right only" button 160R is manipulated in the case of displaying only a right-eye image to a viewer who is located in the range (viewing angle) iR+iR$\alpha$ shown in FIG. 6 (i.e., to only a viewer located in a right-side range in front of the image display apparatus 8). When the button 160R is depressed, the main control circuit 100 turns on only the right-eye light-emitting elements 810*b* and 810*d* of the light-emitting element 810 of the image display apparatus 8 and turns off the other light-emitting elements, as a result of which only a right-side viewing angle is obtained as indicated by iR+iR$\alpha$ in FIG. 6. At the same time, the main control circuit 100 turns on the light-emitting portions 180*b* and 180*d* (i.e., the light-emitting portions on the right of the center) of the viewing angle indicator 180 shown in FIG. 1 to indicate that only a right-side viewing angle is available.

Figure 9:
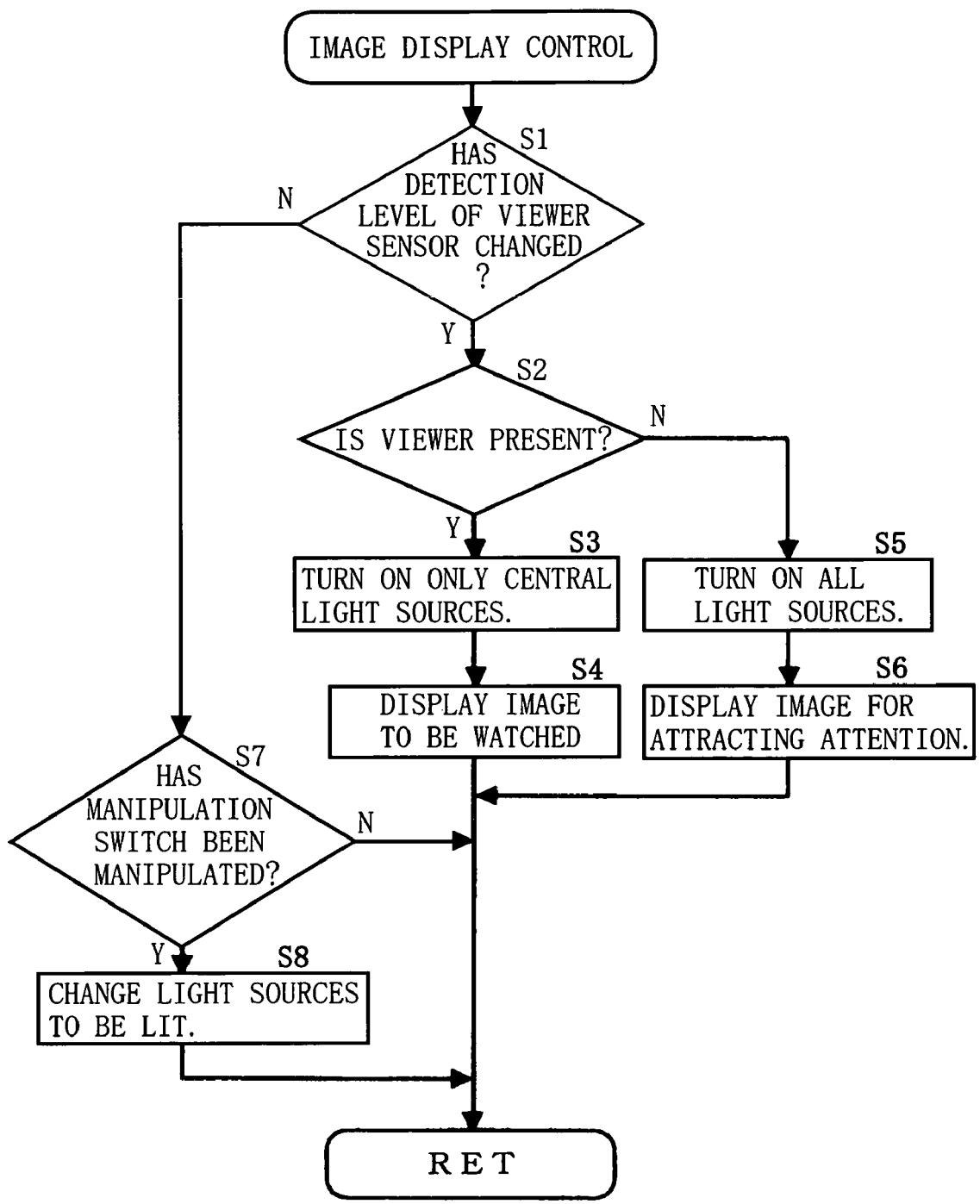
FIG. 9 is a flowchart showing an exemplary control.

FIG. 9 is a flowchart showing an exemplary control performed by the main control circuit 100 every prescribed cycle.

First, at step S1, it is judged whether a current detection level of the viewer sensor 270 is different from a preceding one. If it is judged that the current detection level is different from the preceding one, the process moves to step S2, where it is judged whether an operator (or viewer) is present. If a viewer is present (or has come), the process moves to step S3. If no viewer is present (or a viewer is gone), the process moves to step S5.

At step S3 to which the process moves if a viewer is present, only the central light-emitting elements 180*a* and 180*b* are turned on and the other light-emitting elements are turned off to establish a state that the viewing angle is smallest. At step S4, an image to be presented to the viewer is displayed. In this embodiment, three-dimensional image display is performed by drawing a left-eye image (first image) and a right-eye image (second image).

On the other hand, at step S5 to which the process moves if no viewer is detected, all the light-emitting elements 810*a*-810*d* are turned on to establish a state that the viewing angle is largest. At step S6, the display control circuit 150 generates and causes display of an image for attracting a viewer's attention to thereby urge a person who is passing, for example, in front of the image display apparatus 8 to watch the image.

On the other hand, if it is judged at step S1 that the current detection level of the viewer sensor 270 is not different from the preceding one (i.e., no viewer has come to or left the place concerned), the process moves to step S7, where it is judged whether the manipulation switch 160 has been manipulated by a viewer. If the manipulation switch 160 has been manipulated and thereby an instruction to change the viewing angle has been input, the process moves to step S8, where a viewing angle control is performed in accordance with which of the buttons 160W-160R has been depressed (described above). If the manipulation switch 160 has not been manipulated by a viewer, the light source lighting state is not changed and a return is made without performing any other processing.

The above-described control enables an adjustment to a viewing angle that is desired by a viewer, and hence enables a change to a display environment that is suitable for surrounding conditions. The image display apparatus 8 is equipped with the viewing angle indicator 180 as an indicator for indicating a viewing angle so as to present information relating to a viewing angle, which makes it possible to indicate a viewing angle to a viewer in an easy-to-recognize manner. Further, since a viewer can recognize an operation state of the image display apparatus 8 from outside the viewing angle range, he or she can move his or her viewing point into the viewing angle range even if the viewing angle is small.

Although all the light sources 810*a*-810*d* are turned on at step S5, all the light sources 810*a*-810*d* may start to flash instead. In the latter case, a viewer can be guided into the viewing angle range.

Figure 10:
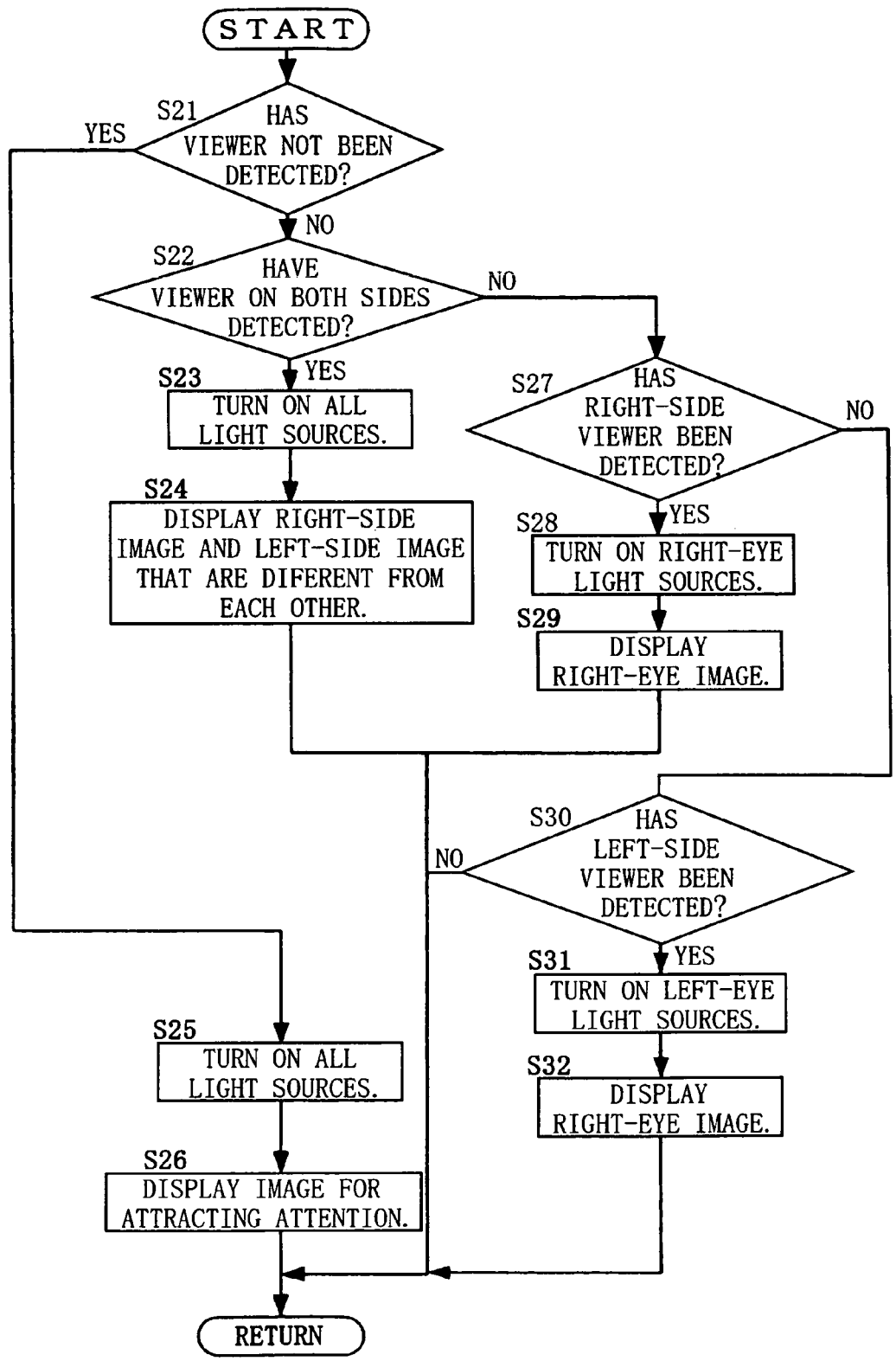
FIG. 10 is a flowchart showing an exemplary control according to a second embodiment.

FIG. 10 shows a second embodiment in which plural viewer sensors 270 are provided that are the same as the viewer sensor 270 used in the first embodiment. A viewer located in the range of a left-side image viewing angle and a viewer located in the range of a right-side image viewing angle are detected separately, and the viewing angle is switched automatically in accordance with a detection result. The other part of the configuration is the same as in the first embodiment. In this case, the manipulation switch 160 is not used.

For example, referring to FIG. 6, the viewer sensors 270 are a sensor for detecting a viewer who is located in the range of the left-eye image viewing angle iL+iL$\alpha$ and a sensor for detecting a viewer who is located in the range of the right-eye image viewing angle iR+iR$\alpha$. In this embodiment, the left-eye image viewing angle iL+iL$\alpha$ corresponds to the left-side image viewing angle and right-eye image viewing angle iR+iR$\alpha$ corresponds to the right-side image viewing angle. The right-eye light-emitting elements 810*b* and 810*d* function as right-side light-emitting elements for emitting light toward a viewer who is located in the range of the right-side image viewing angle, and the left-eye light-emitting elements 810*a* and 810*c* function as left-side light-emitting elements for emitting light toward a viewer who is located in the range of the left-side image viewing angle.

At step S21 shown in FIG. 10, whether an operator (or a viewer) is present is judged on the basis of detection results of the viewer sensors 270. If a viewer is present, the process moves to step S22. If no viewer is present, the process moves to step S25.

At step S22 to which the process moves if a viewer is present, it is judged whether a viewer exists in the range of the right-side image viewing angle and whether a viewer exists in the range of the left-side image viewing angle. If a viewer exists in both ranges, the process moves to step S23, where all the light-emitting elements 810*a*-810*d* are turned on to establish a state that the viewing angle is largest. At step S24, the display control circuit 150 causes display of a left-side image and a right-side image that are different from each other in information content. In a left-side image and a right-side image, a weather forecast and news information may be displayed as the right-side image and the left-side image, respectively.

On the other hand, at step S25 to which the process moves if no viewer is detected, all the light-emitting elements 810*a*-810*d* are turned on to establish a state that the viewing angle is largest. At step S26, the display control circuit 150 generates and causes display of an image for attracting a viewer's attention to thereby urge a person who is passing, for example, in front of the image display apparatus 8 to watch the image.

On the other hand, if a viewer does not exist in both viewing angle ranges, the process moves to step S27, where it is judged whether a viewer exists in the range of the right-side image viewing angle. If a viewer exists in the range of the right-side image viewing angle, the process moves to step S28, where the right-side light-emitting elements 810*b* and 810*d* are turned on and the other light-emitting elements are turned off. At step S29, a right-side image is generated and only the right-side image is displayed.

On the other hand, at step S30, it is judged whether a viewer exists in the range of the left-side image viewing angle. If a viewer exists in the range of the left-side image viewing angle, the process moves to step S31, where the left-side light-emitting elements 810*a* and 810*c* are turned on and the other light-emitting elements are turned off. At step S32, a left-side image is generated and only the left-side image is displayed.

Detecting viewers located in the respective viewing angle ranges in the above-described manner makes it possible to present an image to only a region(s) where a viewer exists by changing the viewing angle of the image display apparatus 8 automatically.

Where the image display apparatus 8 is used in, for example, a lobby of an airport, an arrival flight schedule and a departure flight schedule may be displayed as a left-side image and a right-side image, respectively.

Figure 11:
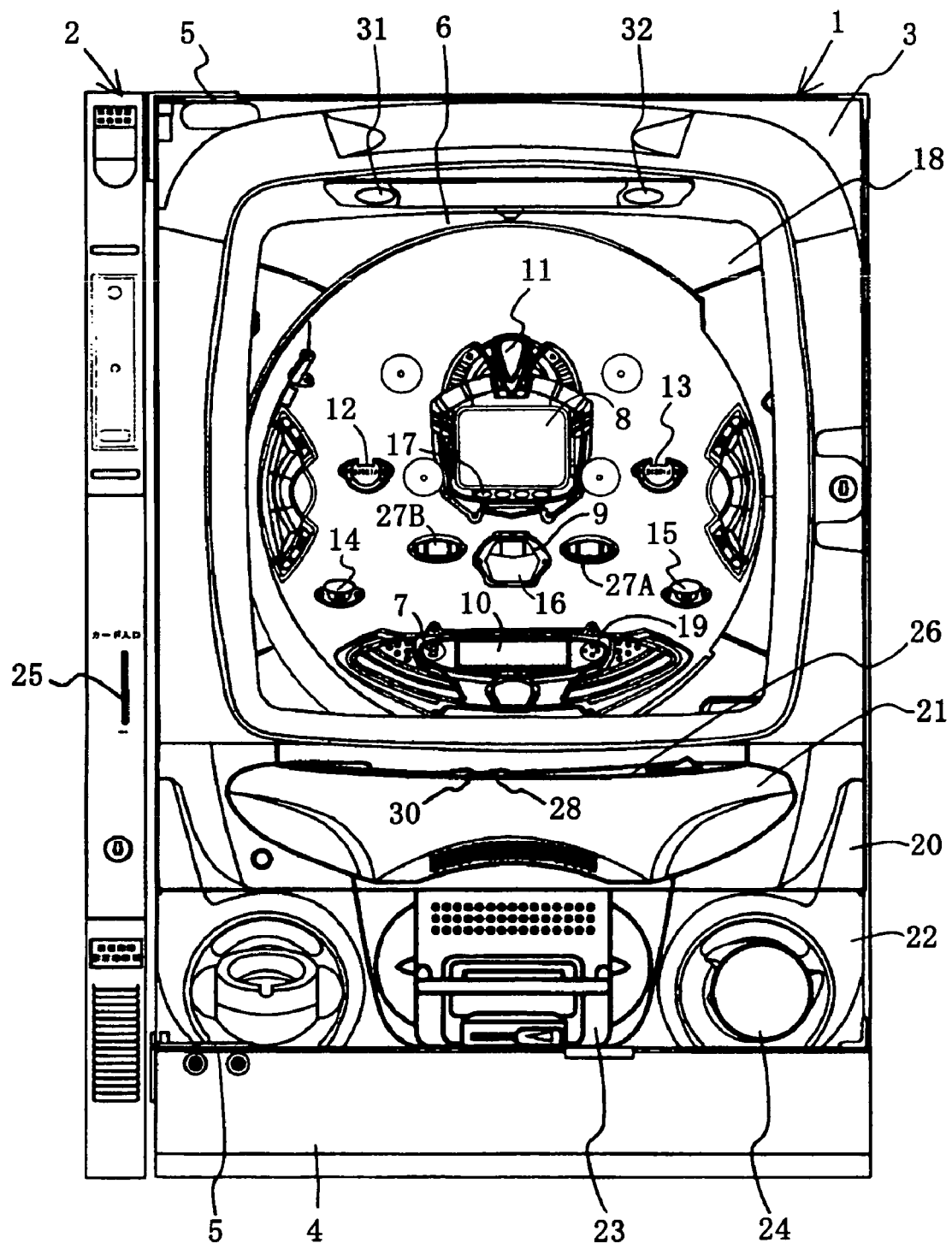
FIG. 11 is a front view of a game machine according to a third embodiment.
Figure 12:
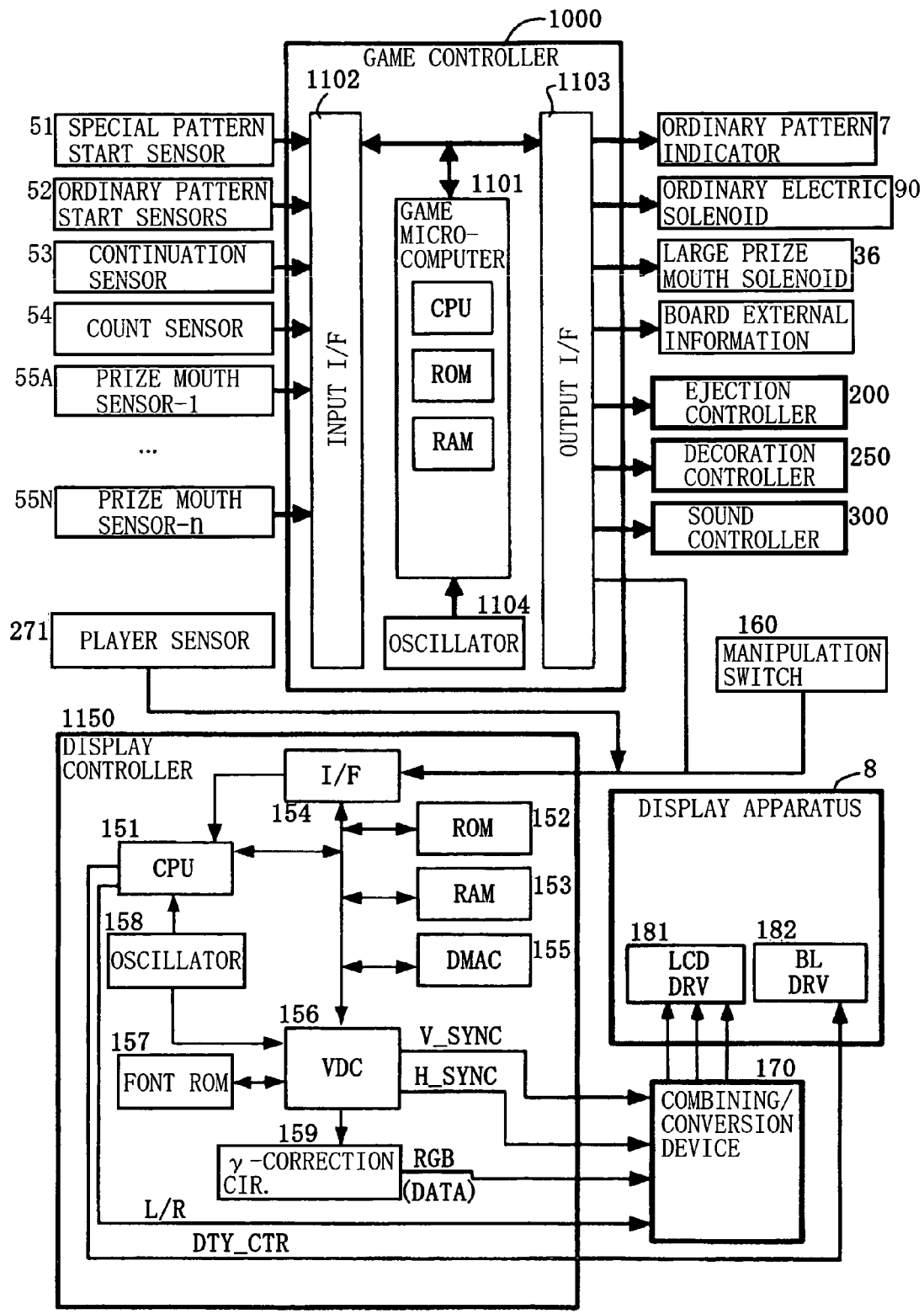
FIG. 12 is a block diagram of a control system of the same.

FIG. 11 is a front view showing the entire configuration of a game machine (a CR machine to which a card-type ball lending unit is attached) according to a third embodiment. FIG. 12 is a block diagram of a control system.

A front frame 3 of the game machine (pachinko machine) 1 is attached to a main body frame (outer frame) 4 via hinges 5 so as to be able to rotate for opening or closure, and a game board 6 is set inside an accommodation frame (not shown) that is attached to the back surface of the front frame 3.

The front surface of the game board 6 is formed with a game area where an image display apparatus (variable display means) 8, a variable prize-giving device 10 having a large winning pocket, general winning pockets 11-15, a slots-driving pocket 16, ordinary pattern driving gates 27A and 27B, an ordinary pattern indicator 7, and an ordinary variable prize-giving device 9 (auxiliary prize-giving means), or the like are arranged. A cover glass 18 for covering the game board 6 from the front side is attached to the front frame 3.

The image display apparatus 8 is basically the same as that according to the first embodiment but a player sensor 271 is used instead of the viewer sensor 270. The player sensor 271 is disposed on the front side of the game machine 1.

For example, the image display apparatus 8 (display apparatus) displays three, that is, left, middle, and right, display patterns (identification information) in a display area. For example, these display patterns are formed by numerals 0 to 9, alphabetical characters A to E, or the like.

When prizewinning entrance of a play ball into the slots-driving pocket 16 has occurred, the image display apparatus 8 displays, in order, display patterns formed by the above numerals and characters. If prizewinning entrance of a play ball into the slots-driving pocket 16 occurs with prescribed timing (more specifically, if a special pattern random number counter has a hit value when the prizewinning entrance is detected), a big hit state (special playing state) is established and the three display patterns are stopped in a state that they are identical (a big hit pattern). In response, the large winning pocket of the variable prize-giving device 10 is opened widely for a prescribed time (e.g., 30 seconds) to allow the player to get many play balls.

Entry of a play ball into the slots-driving pocket 16 is detected by a special pattern start sensor 14 (see FIG. 12). Timing of passage of the play ball (more specifically, a value of the special pattern random number counter provided in a game controller 1000 (see FIG. 12) at the time of detection of the prizewinning entrance) is stored as special pattern prizewinning storage information in a prescribed storage area (special pattern random number storage area) of the game controller 1000 (upper limit: a prescribed number of pieces of information that occur consecutively). The number of stored pieces of special pattern prizewinning storage is displayed by a special pattern storage state indicator 17 that consists of plural LEDs and is disposed under the image display apparatus 8. The game controller 1000 controls a variable display game on the basis of the special pattern prizewinning storage using the image display apparatus 8.

When prizewinning entrance of a play ball into the ordinary pattern driving gate 27A or 27B has occurred, the ordinary pattern indicator 7 starts variable display of an ordinary pattern (e.g., a pattern of a single numeral). If prizewinning entrance of a play ball into the ordinary pattern driving gate 27A or 27B occurs with prescribed timing (more specifically, if an ordinary pattern random number counter value has a hit value when the prizewinning entrance is detected), an ordinary pattern hit state is established and the ordinary pattern is stopped at a hit pattern (hit number). In response, the ordinary variable prize-giving device 9 which is disposed before the slots-driving pocket 16 is opened widely for a prescribed time (e.g., 0.5 second) to increase the probability of prizewinning entrance of a play ball into the slots-driving pocket 16.

Passage of a play ball through the ordinary pattern driving gate is detected by an ordinary pattern start sensor 52 (see FIG. 12). Timing of passage of the play ball (more specifically, a value of the ordinary pattern random number counter provided in the game controller 1000 at the time of detection of the passage) is stored as ordinary pattern prizewinning storage information in a prescribed storage area (ordinary pattern random number storage area) of the game controller 1000 (upper limit: a prescribed number of pieces of information (e.g., four pieces of information that occur consecutively)). The number of stored pieces of ordinary pattern prizewinning storage is displayed by an ordinary pattern storage state indicator 19 that consists of plural LEDs and is disposed on the right of and on the left of the ordinary pattern indicator 7. The game controller 1000 determines an ordinary pattern hit by lot on the basis of the special pattern prizewinning storage. The number of pieces of ordinary pattern prizewinning storage to be stored in the ordinary pattern storage state indicator 19 is set at an arbitrary value.

An openable/closable panel 20 located under the front frame 3 is provided with an upper saucer 21 from which balls are supplied to a ball launcher, and a fixed panel 22 is provided with a lower saucer 23, an operating portion 24 of the ball launcher, and other components.

A portion, over the cover glass 18, of the front frame 3 is provided with a first notification lamp 31 and a second notification lamp 32 (see FIG. 12) for notification of such states as a ball ejection abnormality (notification is effected by turning them on).

An operating panel 26 for the card-type ball lending unit is provided with a card balance indicating portion (not shown) for indicating a balance of a card, a ball lending switch 28 for ordering ball lending, a card return switch 30 for ordering return of a card, and other components.

The card-type ball lending unit 2 incorporates a ball lending controller and a card reader/writer for performing reading, writing, or the like on data of the card (prepaid card or the like) inserted in a card insertion portion 25 that is provided on the front side. The operating panel 26 for the card-type ball lending unit is formed on the outer surface of the upper saucer 21 of the game machine 1.

FIG. 12 is a block diagram of a control system that is centered by the game controller 1000.

The game controller 1000, which is a main controller for performing a total game control, is composed of a game microcomputer 1101 incorporating a CPU for performing a game control, a ROM in which invariable information for the game control is stored, and a RAM that is used as a work area during the game control, an input interface 1102, an output interface 1103, and an oscillator 1104, or the like.

The game microcomputer 1101 receives detection signals from various detection devices (special pattern start sensor 51, general winning pocket sensors 55A-55N, count sensor 54, continuation sensor 53, and ordinary pattern start sensors 52) via the input interface 1102, and performs various kinds of processing such as determination of a big hit by lot. The game microcomputer 1101 performs a total game control by sending instruction signals to various controllers (display controller 1150, ejection controller 200, decoration controller 250, and sound controller 300), a large winning pocket solenoid 36, an ordinary electric solenoid 90, the ordinary pattern indicator 7, or the like via the output interface 1103.

The ejection controller 200 causes ejection of prize balls or lent balls by controlling operation of the card-type ball lending unit on the basis of a prize ball instruction signal from the game controller 1000 or a ball lending request from the card-type ball lending unit 2.

The decoration controller 250 controls decoration light-emitting devices such as decoration lamps and LEDs on the basis of a decoration instruction signal from the game controller 1000, and also controls display of the special pattern storage indicator (special pattern reservation LEDs) 17 and the ordinary pattern storage indicator 19.

The sound controller 300 controls output of a sound effect from a speaker. Only unidirectional communications from the game controller 1000 to the various subordinate controllers (display controller 1150, ejection controller 200, decoration controller 250, and sound controller 300) are permitted. This prevents input of an improper signal from the subordinate controller side to the game controller 1000.

The display controller 1150 as part of display control means performs an image display control in the same manner as the display control circuit shown in FIG. 7, and components of the former having the same components in the latter are given the same reference symbols as those components of the latter. The display controller 1150 and a combining/conversion device 170 constitute the display control means.

The display controller 1150 is composed of a CPU 151, a GDP 156, a RAM 153, an interface 154, a ROM 152 in which programs or the like are stored, a font ROM 157 in which image data (pattern data, background image data, moving character data, texture data, or the like) are stored, an oscillator 158 for generating sync signals and a timing signal to be used for generating a strobe signal, and other components.

Running programs stored in the ROM 152, the CPU 151 calculates image control information (pattern display information that is sprite data, polygon data, or the like, background image information, moving object image information, or the like) for a prescribed variable display game on the basis of signals supplied from the game controller 1000 and instructs a GDP 156 how to perform image generation.

The GDP 156 performs image sprite drawing or polygon drawing (or ordinary bitmap drawing), for example, on the basis of the image data stored in the font ROM 157 and the image control information that has been calculated by the CPU 151, and stores resulting data in the RAM 153 as a frame buffer.

The GDP 156 sends the image stored in the RAM 153 to the LCD side (combining/conversion device 170) with prescribed timing (according to a vertical sync signal V_SYNC and a horizontal sync signal H_SYNC).

The drawing processing performed by the GDP 156 is the same as performed by the GDP 156 shown in FIG. 7, and the GDP 156 outputs image signals to the combining/conversion device 170 via a γ-correction circuit 159.

A configuration is possible in which plural frame buffers are set in, for example, respective prescribed storage areas of the RAM 153 and the GDP 156 outputs an image obtained by overlaying the above-generated image on an arbitrary image.

The oscillator 158 for supplying a clock signal is connected to the GDP 156. The clock signal generated by the oscillator 158 determines an operation cycle of the GDP 156. The GDP 156 generates a vertical sync signal (V_SYNC) and a horizontal sync signal (H_SYNC) by frequency-dividing the clock signal and outputs those to the combining/conversion device 170. At the same time, the GDP 156 outputs the vertical sync signal (V_SYNC) and the horizontal sync signal (H_SYNC) to the image display apparatus 8 via the combining/conversion device 170.

RGB signals that are output from the GDP 156 are input to the γ-correction circuit 159. The γ-correction circuit 159 generates RGB signals to be output to the image display apparatus 8 by adjusting the display brightness of the image display apparatus 8 by correcting for nonlinearity of the brightness against the signal voltage of the image display apparatus 8.

The CPU 151 of the display controller 1150 outputs, on the basis of a clock signal supplied from the oscillator 158, an L/R signal to be used for recognizing which of the image data (RGB) that are output to the combining/conversion device 170, i.e., left-eye image or right-eye image.

Further, to control the light emission quantity (brightness) of the image display apparatus 8 on the basis of a variable display state (e.g., ordinary variable display game or display of a big hit) and a game state (e.g., customer waiting state), the CPU 151 generates duty control signals DTY_CTR on the basis of the clock signal supplied from the oscillator 158 and outputs those to the image display apparatus 8.

Equipped with a right-eye frame buffer, a left-eye frame buffer, and a 3-D vision frame buffer, the combining/conversion device 170 writes a right-eye image and a left-eye image to the right-eye frame buffer and the left-eye frame buffer, respectively, on the basis of the L/R signal supplied from the GDP 156. The combining/conversion device 170 generates a 3-D vision image by combining the right-eye image and the left-eye image together, writes it to the 3-D vision frame buffer, and outputs the 3-D vision image data to the image display apparatus 8 as RGB signals.

Like the image display apparatus according to the first embodiment, the image display apparatus 8 incorporates a liquid crystal driver (LCD DRV) 181 and a backlight driver (BL DRV) 182. The liquid crystal driver (LCD DRV) 181 displays an image on a liquid crystal panel 804 by sequentially applying voltages to the electrodes of the liquid crystal panel 4 on the basis of the V_SYNC signal, H_SYNC signal, and RGB signals that are sent from the combining/conversion device 170.

The backlight driver 182 changes the viewing angle of the image display apparatus 8 by changing the duty ratios of voltages that are applied to the light-emitting element (backlight) 810 on the basis of the DTY_CTR signals that are output from the CPU 151.

The viewer sensor 271 for detecting a player (viewer) is connected to the display controller 1150. The CPU 151 detects presence/absence of a player or a game state by reading a signal from the player sensor 271. For example, the viewer sensor 271 may be a touch sensor (not shown) that is attached to the manipulation portion 24 of the ball launcher. In this case, while the touch sensor is on, it can be judged that a player is making a ball launching manipulation by touching the manipulation portion 24, that is, it can be judged that a player is present and he or she is playing.

Alternatively, presence/absence of a player may be detected by an infrared sensor that is disposed in front of the game machine 1 or a pressure sensor that is installed on a chair for the game machine 1. In each of these cases, presence of a player can be detected even if he or she is not in touch with the manipulation portion 24 (e.g., because of a short break).

A manipulation switch 160 for allowing a player to set a viewing angle is connected to the display controller 1150. A viewer inputs an instruction through the manipulation switch 160. The manipulation switch 160 is configured in the same manner as that shown in FIG. 7 (first embodiment), and is led out from the game machine 1 to the player side with a cord or the like.

Figure 13:
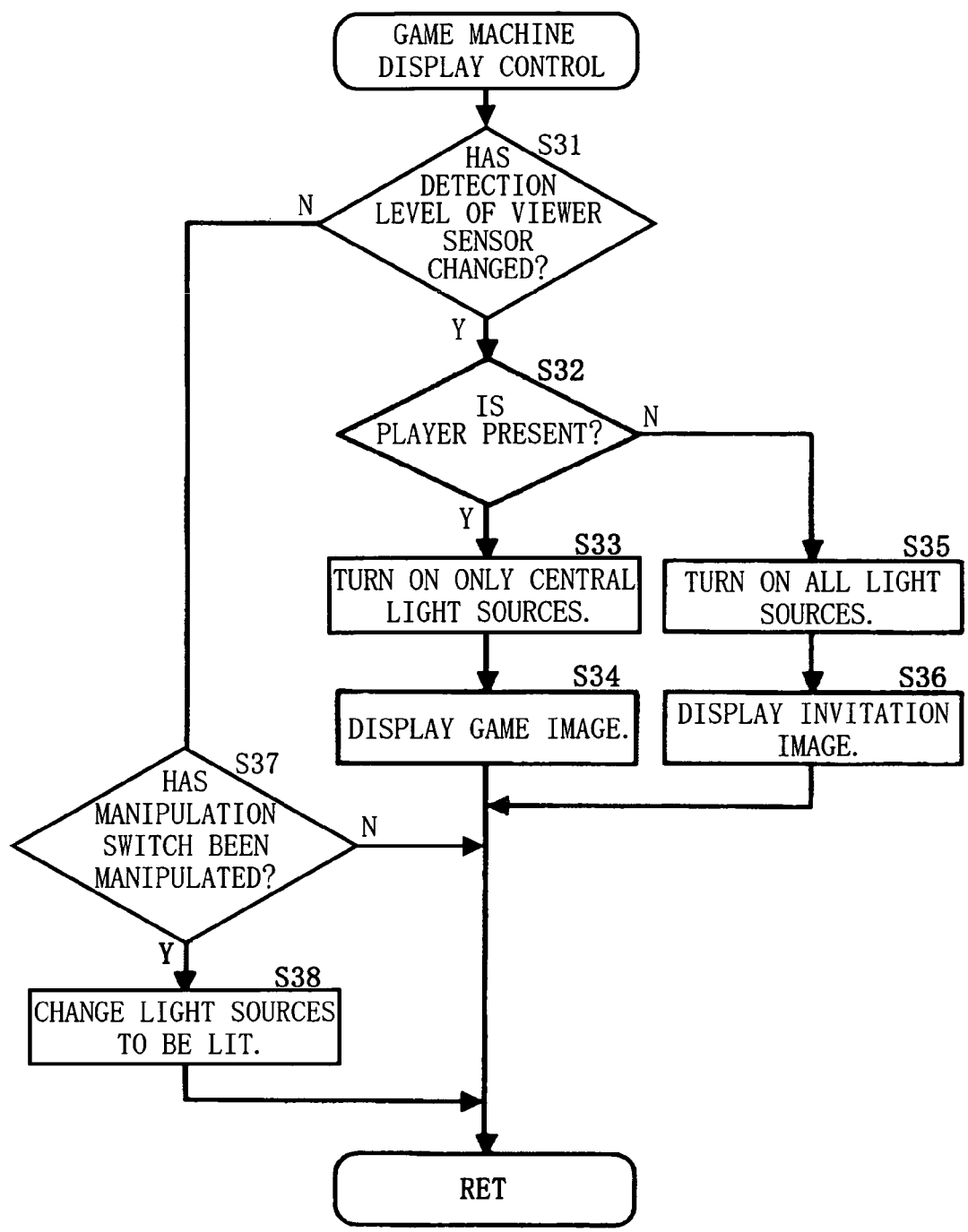
FIG. 13 is a flowchart showing an exemplary control that is performed by a display controller.

Next, a light emission control that is performed by the display controller 1150 in accordance with a viewing-angle-controlled playing state will be described with reference to FIG. 13.

First, at step S31, it is judged whether a current detection level of the player (viewer) sensor 271 is different from a preceding one. If it is judged that the current detection level is different from the preceding one, the process moves to step S32, where it is judged whether a player (or viewer) is present. If a player is present (or has come), the process moves to step S33. If no player is present (or a player is gone), the process moves to step S35.

At step S33 to which the process moves if a player is present, only the central light-emitting elements 180*a* and 180*b* are turned on and the other light-emitting elements are turned off to establish a state that the viewing angle is smallest. At step S34, a game image is displayed. In this embodiment, three-dimensional image display is performed by drawing a left-eye image (first image) and a right-eye image (second image).

On the other hand, at step S35 to which the process moves if no player is detected, all the light-emitting elements 810*a*-810*d* are turned on to establish a state that the viewing angle is largest. At step S36, the display controller 150 generates and causes display of a standby image to thereby urge a person who is passing, for example, in front of the game machine 1 to play.

On the other hand, if it is judged at step S31 that the current detection level of the player sensor 271 is not different from the preceding one (i.e., no player has come to or left the place concerned), the process moves to step S37, where it is judged whether the manipulation switch 160 has been manipulated by a player. If the manipulation switch 160 has been manipulated and thereby an instruction to change the viewing angle has been input, the process moves to step S38, where a viewing angle control is performed in accordance with which of the buttons 160W-160R has been depressed (described above). If the manipulation switch 160 has not been manipulated by a player, the light source lighting state is not changed and a return is made without performing any other processing.

The above-described control enables an adjustment to a viewing angle that is desired by a player and hence switching to a viewing angle that covers the side to which the player wants to show how a game proceeds. Therefore, a change to a display environment that is suitable for surrounding conditions is enabled.

Although all the light sources 810*a*-810*d* are turned on at step S35, all the light sources 810*a*-810*d* may start to flash instead. In the latter case, more attention of a player can be attracted.

Figure 14:
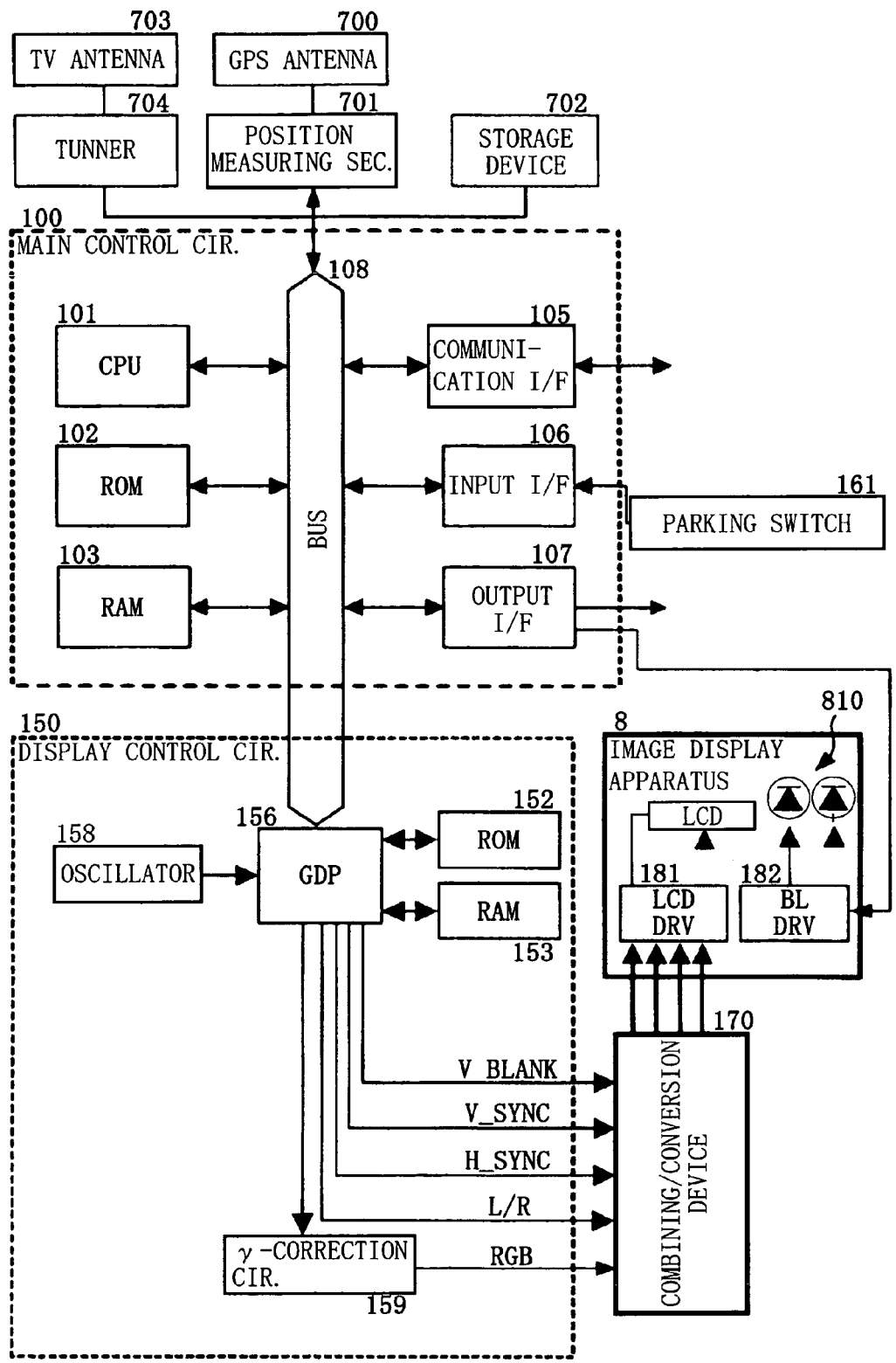
FIG. 14 is a block diagram of a car navigation system according to a fourth embodiment.

FIG. 14 shows a fourth embodiment in which the image display apparatus 8 according to the second embodiment is applied to a car navigation system. Components of the fourth embodiment having the same components in the second embodiment are given the same reference symbols as the latter and redundant description therefor will be omitted.

A position measuring section 701 for measuring the position of its own vehicle on the basis of a signal supplied from a GPS antenna 700 and a storage device 702 in which map information or the like are stored are connected to the bus 108 of the main control circuit 100. Based on a calculated current position of its own vehicle and the map information stored in the storage device 702, the CPU 101 causes the image display apparatus 8 to display the current vehicle position on a map.

A tuner 704 for selecting a desired channel on the basis of signals supplied from a TV antenna and generating an image is connected to the bus 108, whereby a desired broadcast can be displayed on the image display apparatus 8.

A parking switch 161 for detecting the operation state of a parking brake of the vehicle is connected to the input interface 106 of the main control circuit 100. The parking switch 161 indicates a parking state when it is on, and indicates a running state when it is off.

Figure 15:
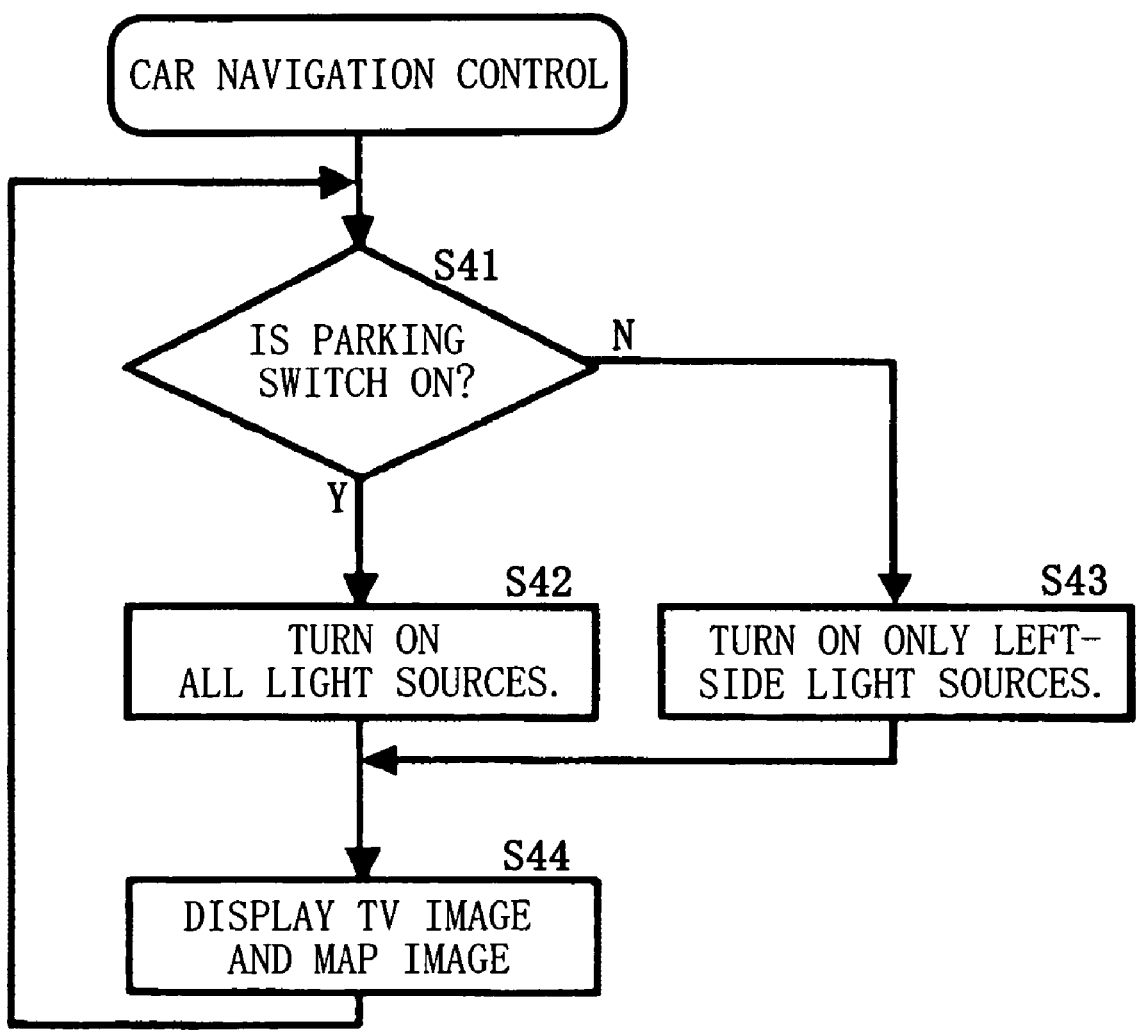
FIG. 15 is a flowchart showing an exemplary control performed in the same.

FIG. 15 shows an exemplary control of the above car navigation system.

At step S41, it is judged whether the parking switch 161 is on. The process moves to step S42 if the parking switch 161 is on (parking state), and moves to step S43 if the parking switch 161 is off (running state).

At step S42 (parking state), all the light-emitting elements 810*a*-810*d* are turned on. At step S43 (running state), only the left-side light-emitting elements 810*a* and 810*c* are turned on and the other light-emitting elements are turned off.

At step S44, a TV image is drawn as a left-side image and an image indicating the position of the vehicle is displayed as a right-side image.

While the vehicle is running, the right-side light-emitting elements 810*a* and 810*c* are turned off and hence no video is presented to the driver side, which prevents the driver from looking aside. On the other hand, a TV image can always be displayed as the left-side image that is presented to the seat next to the driver and the passenger in that seat can always enjoy a TV image. Further, since the right-side image and left-side image are different from each other in information content, different kinds of information that are necessary for the driver and the passenger can be presented to them with proper switching though the same display area is used.

On the other hand, when the parking switch 161 is turned on, the right-side image, that is, the driver's side image, comes to be displayed, which enables the driver to recognize the position of the vehicle.

Figure 16:
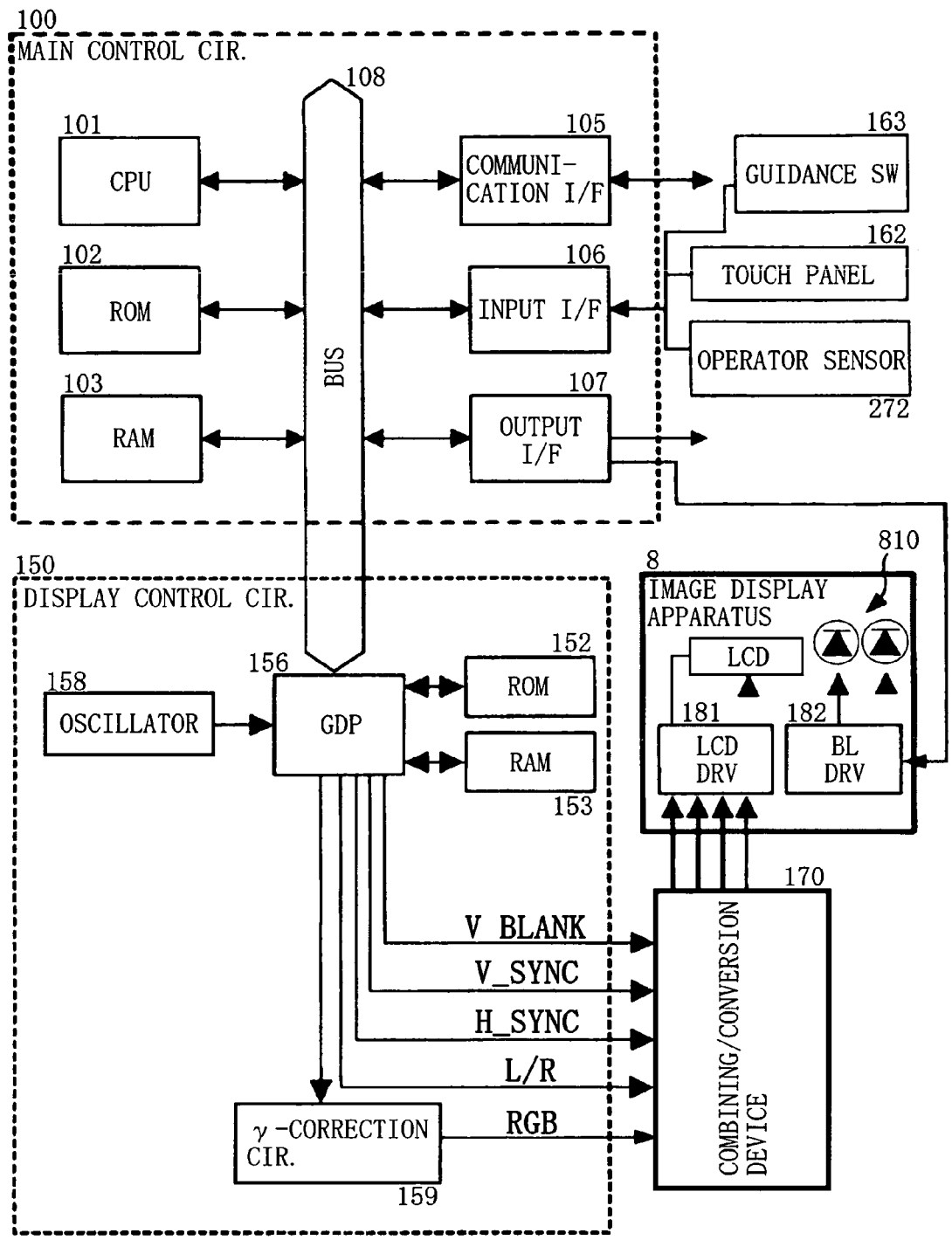
FIG. 16 is a block diagram of an ATM according to a fifth embodiment.

FIG. 16 shows a fifth embodiment in which the image display apparatus 8 according to the first embodiment is applied to an ATM (automatic teller machine). Components of the fifth embodiment having the same components in the first embodiment are given the same reference symbols as the latter and redundant description therefor will be omitted.

An operator sensor 272 for detecting whether an operator exists neat the machine, a touch panel 162 through which an operator inputs a password and instructions such as an amount of money, and a guidance key switch 163 through which to order switching to a guidance mode by a key manipulation are connected to the input interface 106 of the main control circuit 100. The guidance mode is a mode in which a person in charge teaches a manipulation method of the touch panel 162 to a person who is not familiar with it. The viewing angle of the touch panel 162 is increased temporarily in this mode. The touch panel 162 may be disposed over the display screen of the image display apparatus 8.

Figure 17:
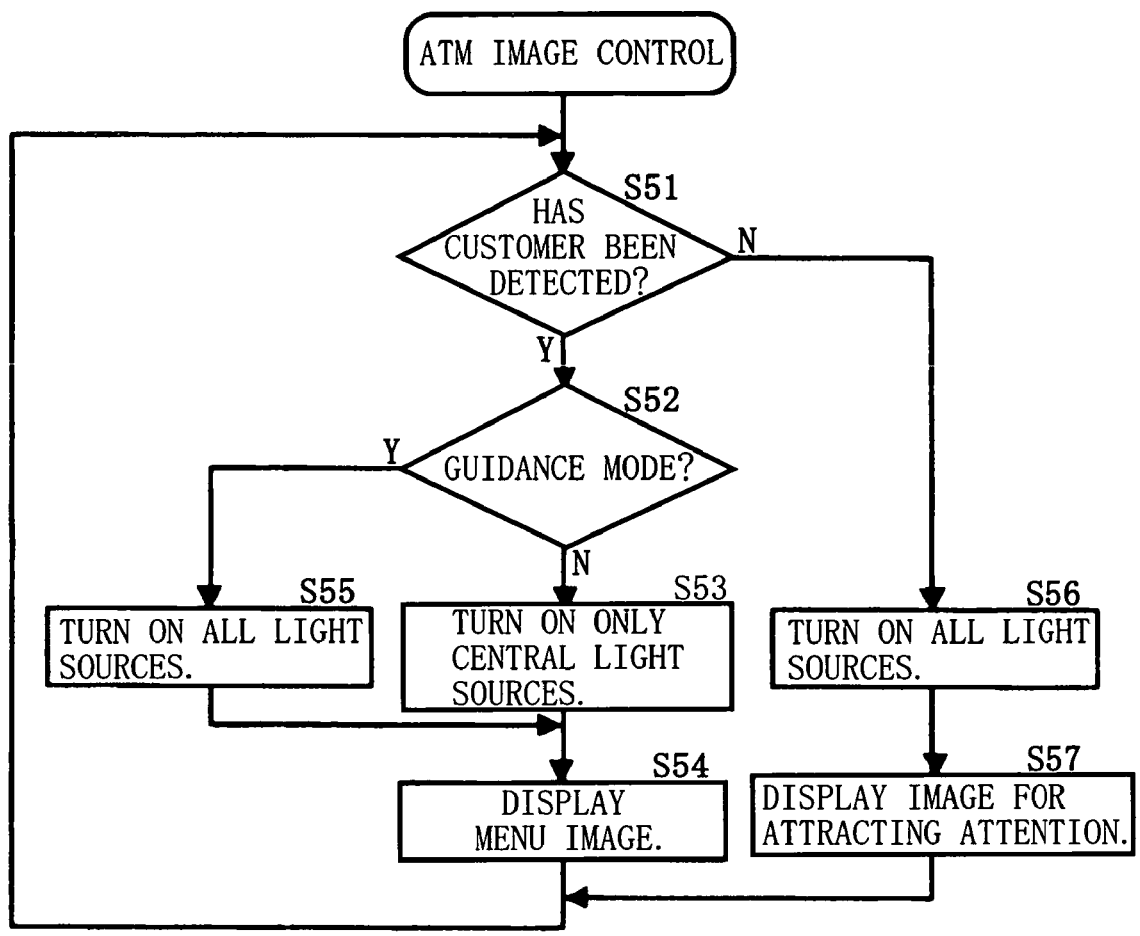
FIG. 17 is a flowchart showing an exemplary control performed in the same.

FIG. 17 is a flowchart showing an exemplary control performed by the main control circuit 100. First, at step S51, presence/absence of a customer (operator) is judged on the basis of a detection result of the operator sensor 272. The process moves to step S52 if a customer exists near the machine, and moves to step S56 if no customer exists.

At step S52 to which the process moves if a customer is detected, it is judged whether the guidance key switch 163 has been manipulated and the guidance mode is established. If the guidance mode is not established, the process moves to step S53, where only the central light-emitting elements 810a and 810b are turned on to establish a state that the viewing angle is small. A menu image is displayed at step S54. Then, processing corresponding to selected menu items (e.g., input of a password and an amount of money) is performed.

On the other hand, if it is judged at step S52 that the guidance mode is established, the process moves to step S55, where all the light-emitting elements 810a-810d are turned on to establish a state that the viewing angle is largest. A menu image is displayed at step S54. Then, processing corresponding to selected menu items (e.g., input of a password and an amount of money) is performed.

At step S56 to which the process moves if no customer exists, all the light-emitting elements 810a-810d are turned on to establish a state that the viewing angle is largest. At step S57, an image for attracting attention (e.g., such characters as "Welcome") is displayed.

With the above control, when no operator exists (i.e., no operator has been detected), the image for attracting attention is displayed in a state that the viewing angle is set largest. Therefore, an operator can visually recognize easily that the machine is in operation. When the operator thereafter makes manipulations by himself or herself (the operator is detected), the viewing angle is small and hence other persons cannot see details of the manipulations. A high-security ATM can thus be provided. In the case of an operator who is not familiar with the manipulation method, a person in charge comes to accompany the operator to teach the manipulation method. In this case, the person in charge makes switching to the guidance mode (viewing angle temporary widening mode) by manipulating the guidance key switch 163 (mode switching means), whereby the viewing angle is increased temporarily. The menu image reaches the eyes of the person in charge and hence his or her manipulation guidance is facilitated.

The application field of the concept of this embodiment is not limited to ATMs and encompasses general apparatus in which an operator makes manipulations including input of an identification code such as a password.

The above-disclosed embodiments should be considered illustrative and not restrictive in all aspects. The scope of the invention is defined by the claims rather than the above description and is intended to cover all modifications that fall within the claims and equivalents thereof and content thereof.

The invention claimed is:

1. An image display apparatus in which a liquid crystal display panel having a display area is illuminated by a light source and a viewer sees an image displayed in the display area when illumination light passes through the liquid crystal display panel and reaches an eye or eyes of the viewer, characterized in that the light source is configured in such a manner that lighting positions or lighted regions can be changed, the image display apparatus further comprising;
   optical means for converging light emitted from the light source and passes through the liquid crystal display panel so that the light goes to a prescribed range; and
   lighting control means for performing a control of changing the lighting positions or lighted regions of the light source, the image display apparatus further characterized in that:
      a range defined by a viewing angle, from which an image displayed in the display area is viewable, is changed by the lighting control means's changing a diffusion range of light emitted from the light source,
   the image display apparatus further comprising;
   a viewing angle notification device for indicating a state of the viewing angle.

2. An image display apparatus in which a liquid crystal panel having a display area is illuminated by a light source and a viewer sees an image displayed in the display area when illumination light passes through the liquid crystal panel and reaches an eye or eyes of the viewer, characterized in that the light source is configured in such a manner that lighting positions or lighted regions can be changed, the image display apparatus further comprising:
   optical means for converging light emitted from the light source and passes through the liquid crystal panel so that the light goes to a prescribed range; and
   lighting control means for performing a control of changing the lighting positions or lighted regions of the light source, the image display apparatus further characterized:
      in that a range defined by a viewing angle, from which an image displayed in the display area is viewable, is changed by the lighting control means's changing a diffusion range of light emitted from the light source,
      in that plural kinds of images that are different from each other in information content are displayed in the display area, and
      in that the optical means converges light coming from the light source so that images that are different from each other in information content are presented to viewers located at different viewing positions,
   the image display device further comprising:
   a viewing angle notification device for indicating a state of the viewing angle.

3. An image display apparatus in which a liquid crystal panel having a display area is illuminated by a light source and a viewer sees an image displayed in the display area when illumination light passes through the liquid crystal panel and reaches an eye or eyes of the viewer, characterized in that the light source is configured in such a manner that lighting positions or lighted regions can be changed, the image display apparatus further comprising:
  optical means for converging light emitted from the light source and passes through the liquid crystal panel so that the light goes to a prescribed range; and
  lighting control means for performing a control of changing the lighting positions or lighted regions of the light source,
the image display apparatus further characterized:
in that a range defined by a viewing angle, from which an image displayed in the display area, is viewable is changed by the lighting control means's changing a diffusion range of light emitted from the light source; and
in that the light source comprises:
  a light-emitting element for emitting light, and
  polarizing means for transmitting toward the optical means, part of the light emitted from the light-emitting element, the part of the light emitted being light having a particular polarization direction and also being light whose polarization direction is perpendicular to the particular polarization direction;
the image display apparatus further characterized by further comprising:
filter means disposed between the liquid crystal display panel and the optical means and configured such that first regions for transmitting light having the particular polarization direction and second regions for transmitting light whose polarization direction is perpendicular to the particular polarization direction are arranged repeatedly in a prescribed direction; and
a viewing angle notification device for indicating a state of the viewing angle.

4. The image display apparatus according to claim 1, characterized in that the lighting control means comprises
viewer position detecting means for detecting a viewing position of a viewer, and controlling a lighting state of the light source so that the viewing angle is changed in accordance with the detected viewing position.

5. The image display apparatus according to claim 4, further comprising:
navigation means for detecting position information of a vehicle and for displaying the detected position information in the display area of the liquid crystal display panel together with map information,
the image display apparatus further characterized in that:
  the lighting control means comprises running state detecting means for detecting whether the vehicle is running or not, and controlling a lighting state of the light source so as to stop display of an image to a driver side if the vehicle is running and to permit display of an image to the driver side if the vehicle is parked.

6. The image display apparatus according to claim 1, characterized in that the lighting control means comprises
viewer presence detecting means for detecting the presence/absence of a viewer, and controlling a lighting state of the light source so that the viewing angle is set larger when no viewer is detected than when a viewer is detected.

7. The image display apparatus according to claim 6, further comprising:
navigation means for detecting position information of a vehicle and for displaying the detected position information in the display area of the liquid crystal panel together with map information,
the image display apparatus further characterized in that:
  the lighting control means comprises running state detecting means for detecting whether the vehicle is running or not, and controlling a lighting state of the light source so as to stop display of an image to a driver side if the vehicle is running and to permit display of an image to the driver side if the vehicle is parked.

8. The image display apparatus according to any one of claims 1 to 3, further comprising:
navigation means for detecting position information of a vehicle and for displaying the detected position information in the display area of the liquid crystal display panel together with map information,
the image display apparatus further characterized in that:
  the lighting control means comprises running state detecting means for detecting whether the vehicle is running or not, and controlling a lighting state of the light source so as to stop display of an image to a driver side if the vehicle is running and to permit display of an image to the driver side if the vehicle is parked.

9. The image display apparatus according to any one of claims 1 to 3, further comprising:
game control means for performing a variable display game by variably displaying plural pieces of identification information in the display area of the liquid crystal display panel and for giving a prize to a player in such a manner that the prize is correlated with a stop display form of the plural pieces of identification information; and
viewing angle selecting means for selecting a viewing angle in accordance with a manipulation input,
the image display apparatus further characterized in that the lighting control means controls a lighting state of the light source in accordance with the viewing angle selected by the viewing angle selecting means.

10. The image display apparatus according to any one of claims 1 to 3, further comprising:
game control means for performing a variable display game by variably displaying plural pieces of identification information in the display area of the liquid crystal display panel and for giving a prize to a player in such a manner that the prize is correlated with a stop display form of the plural pieces of identification information; and
viewing angle selecting means for selecting a viewing angle in accordance with a manipulation input,
the image display apparatus further characterized in that the lighting control means comprises:
viewer position detecting means for detecting a viewing position of a viewer, controlling a lighting state of the light source so that the viewing angle is changed in accordance with the detected viewing position, and controlling the lighting state of the light source in accordance with the viewing angle selected by the viewing angle selecting means.

11. The image display apparatus according to any one of claims 1 to 3, further comprising:
game control means for performing a variable display game by variably displaying plural pieces of identification information in the display area of the liquid crystal display panel and for giving a prize to a player in such a manner that the prize is correlated with a stop display form of the plural pieces of identification information; and viewing angle selecting means for selecting a viewing angle in accordance with a manipulation input, the image display apparatus further characterized in that the lighting control means comprises viewer presence detecting means for detecting presence/absence of a viewer, controlling a lighting state of the light source so that the viewing angle is set larger when no viewer is detected than when a viewer is detected, and controlling the lighting state of the light source in accordance with the viewing angle selected by the viewing angle selecting means.

* * * * *

UNITED STATES PATENT AND TRADEMARK OFFICE
CERTIFICATE OF CORRECTION

PATENT NO. : 7,623,111 B2 Page 1 of 1
APPLICATION NO. : 10/549126
DATED : November 24, 2009
INVENTOR(S) : Sadao Ioki et al.

It is certified that error appears in the above-identified patent and that said Letters Patent is hereby corrected as shown below:

Column 23, line 38, after the phrase "according to"
Delete "claim 1" and insert --any one of claims 1 to 3--

Column 23, line 57, after the phrase "according to"
Delete "claim 1" and insert --any one of claims 1 to 3--

Signed and Sealed this

Twenty-eighth Day of September, 2010

David J. Kappos
*Director of the United States Patent and Trademark Office*